US012120066B2

(12) United States Patent
Abedini et al.

(10) Patent No.: US 12,120,066 B2
(45) Date of Patent: Oct. 15, 2024

(54) FACILITATING FULL-DUPLEX OPERATION USING AN ADVANCED SEARCHER

(71) Applicant: QUALCOMM Incorporated, San Diego, CA (US)

(72) Inventors: Navid Abedini, Basking Ridge, NJ (US); Qian Zhang, Basking Ridge, NJ (US); Yan Zhou, San Diego, CA (US); Kapil Gulati, Belle Mead, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 17/338,511

(22) Filed: Jun. 3, 2021

(65) Prior Publication Data

US 2021/0391971 A1   Dec. 16, 2021

Related U.S. Application Data

(60) Provisional application No. 63/037,424, filed on Jun. 10, 2020.

(51) Int. Cl.
*H04L 5/14* (2006.01)
*H04B 7/08* (2006.01)
*H04L 5/00* (2006.01)
*H04W 24/08* (2009.01)

(52) U.S. Cl.
CPC .............. *H04L 5/14* (2013.01); *H04B 7/0802* (2013.01); *H04L 5/0048* (2013.01); *H04W 24/08* (2013.01)

(58) Field of Classification Search
None
See application file for complete search history.

(56) References Cited

U.S. PATENT DOCUMENTS

| 11,838,151 | B1 * | 12/2023 | Jones ................ H04L 25/0224 |
| 2019/0261344 | A1 * | 8/2019 | Grant ..................... H04B 7/086 |
| 2020/0052753 | A1 * | 2/2020 | Raghavan ............ H04B 7/0695 |

(Continued)

OTHER PUBLICATIONS

International Search Report and Written Opinion—PCT/US2021/035954—ISA/EPO—Sep. 16, 2021.

*Primary Examiner* — Jeffrey M Rutkowski
*Assistant Examiner* — Mehedi S Aley
(74) *Attorney, Agent, or Firm* — Procopio, Cory, Hargreaves & Savitch LLP

(57) ABSTRACT

Apparatus, methods, and computer-readable media for facilitating full-duplex operation are disclosed herein. The disclosed techniques include using an advanced searcher. An example method for wireless communication at a first wireless device includes receiving a set of reference signals from a second wireless device. The example method also includes determining a first set of BPLs based on the set of reference signals. The example method also includes determining a second set of BPLs based on a capability of full-duplex operation with at least one BPL of the first set of BPLs. Additionally, the example method includes performing measurements for the second set of BPLs. The example method also includes communicating using full-duplex operation by transmitting or receiving via a BPL of the first set of BPLs while also performing the other of transmitting or receiving via a BPL of the second set of BPLs.

31 Claims, 15 Drawing Sheets

(56) References Cited

U.S. PATENT DOCUMENTS

| | | | |
|---|---|---|---|
| 2020/0244413 A1* | 7/2020 | Takeda | H04B 7/0695 |
| 2021/0194763 A1* | 6/2021 | Abedini | H04L 41/0806 |
| 2021/0195674 A1* | 6/2021 | Park | H04W 76/18 |
| 2022/0045734 A1* | 2/2022 | Liu | H04W 16/28 |
| 2023/0071471 A1* | 3/2023 | Park | H04B 7/0617 |

* cited by examiner

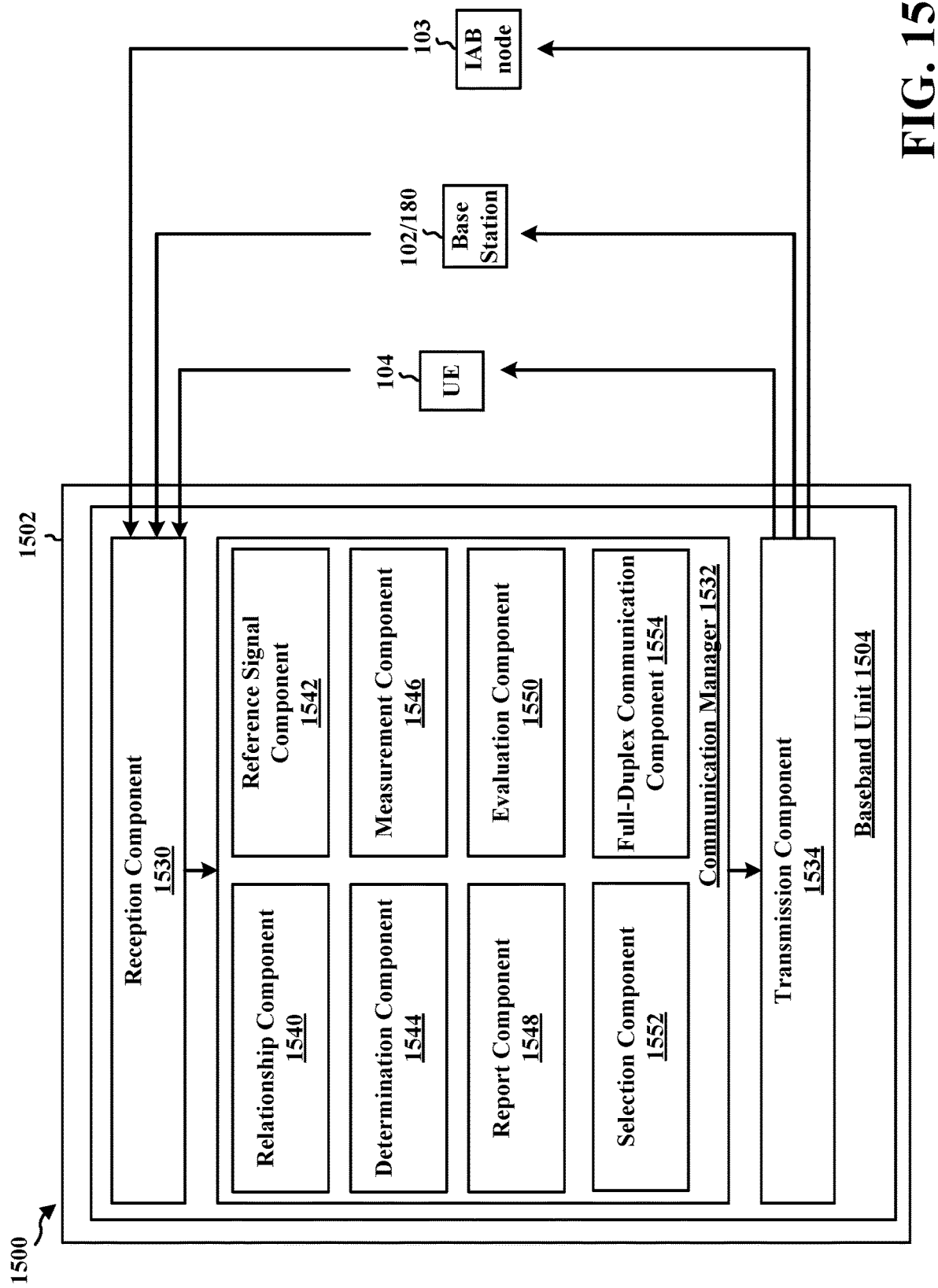

FACILITATING FULL-DUPLEX OPERATION USING AN ADVANCED SEARCHER

CROSS REFERENCE TO RELATED APPLICATION(S)

This application claims the benefit of and priority to U.S. Provisional Application Ser. No. 63/037,424, entitled "METHODS AND APPARATUS TO FACILITATE FULL-DUPLEX OPERATION USING AN ADVANCED SEARCHER," and filed on Jun. 10, 2020, which is expressly incorporated by reference herein in its entirety.

TECHNICAL FIELD

The present disclosure relates generally to communication systems, and more particularly, to wireless communication including full-duplex operation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some examples, a wireless communication device may be capable of full-duplex operation. For example, the wireless communication device may be capable of simultaneously (or nearly simultaneously) transmitting and receiving communications. Thus, a wireless communication device capable of full-duplex operation is capable of transmitting a communication using a first beam and receiving a communication using a second beam. Example techniques disclosed herein enable a wireless communication device to use a first beam candidate that is capable of being used for communication (e.g. for receiving or transmitting a communication) to prioritize searching for a second beam candidate that is capable of being used for communication (e.g., for the other of receiving or transmitting a communication) and that is also full-duplex capable (e.g. that is capable of being used for communication while also using the first beam candidate for communication). By using the first beam candidate to prioritize searching for the second beam candidate, disclosed techniques enable the wireless communication device to reduce latency associated with finding and/or reporting beam candidates by reducing the quantity of beam candidates on which to perform measurements.

In an aspect of the disclosure, a method, a computer-readable medium, and an apparatus are provided for wireless communication at a first wireless device. An example apparatus receives a set of reference signals from a second wireless device. The example apparatus also determines a first set of beam-pair links (BPLs) based on the set of reference signals. The example apparatus also determines a second set of BPLs based on a capability of full-duplex operation with at least one BPL of the first set of BPLs. Additionally, the example apparatus performs measurements for the second set of BPLs. Further, the example apparatus communicates using full-duplex operation by transmitting or receiving via a BPL of the first set of BPLs while also performing the other of transmitting or receiving via a BPL of the second set of BPLs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 15 is a diagram illustrating an example of a hardware implementation for an example apparatus, in accordance with the teachings disclosed herein.

DETAILED DESCRIPTION

Figure 1:
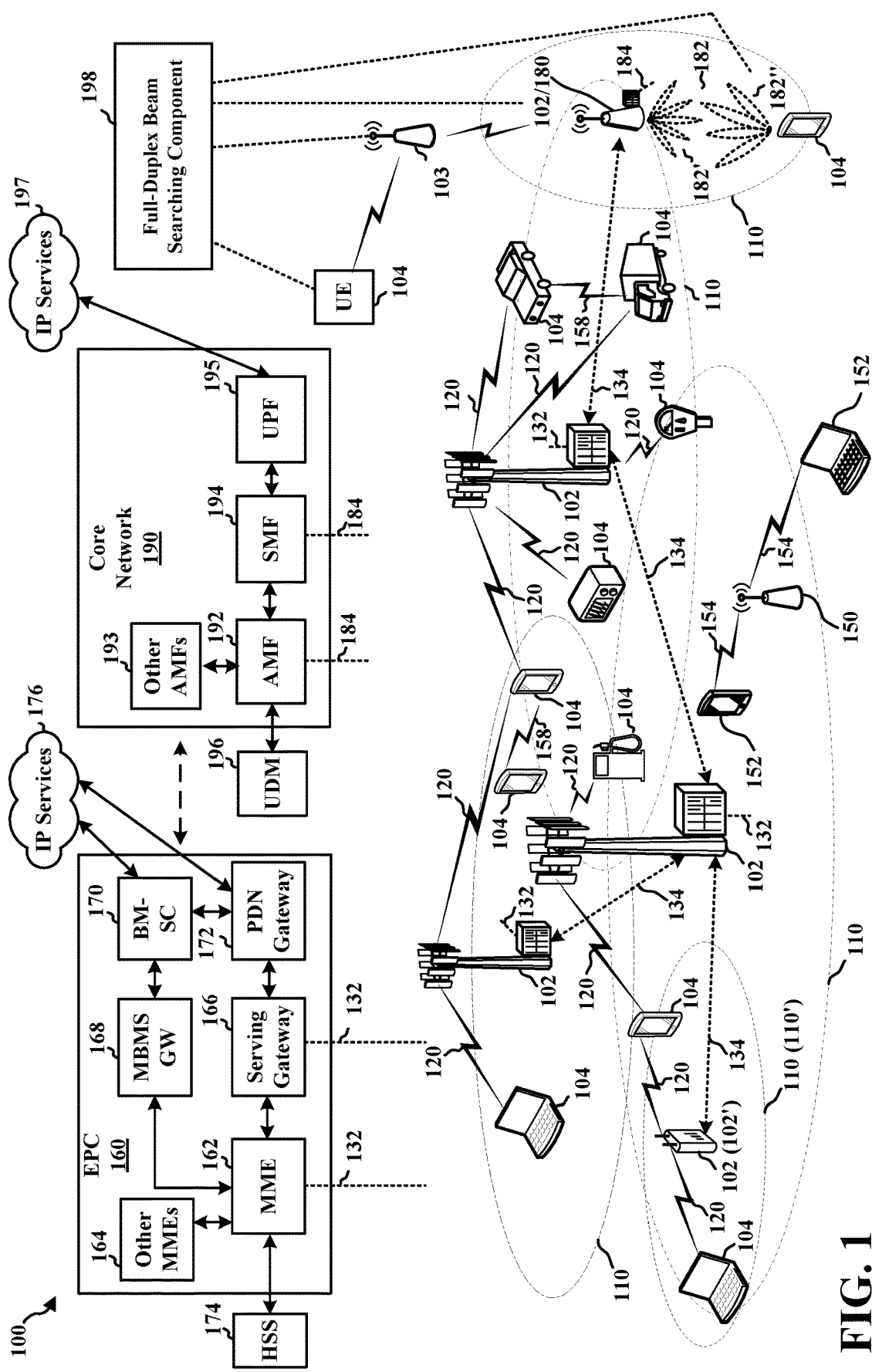
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

Aspects presented herein enable a wireless communication device to communicate using full-duplex operation by simultaneously (or nearly simultaneously) transmitting and receiving communications. For example, aspects presented herein enable a wireless communication device capable of full-duplex operation to transmit a communication using a first beam while also receiving another communication using a second beam. Example techniques disclosed herein enable a wireless communication device to use a first beam candidate that is capable of being used for communication (e.g. for receiving or transmitting a communication) to prioritize searching for a second beam candidate that is capable of being used for communication (e.g., for the other of receiving or transmitting a communication) and that is also full-duplex capable (e.g. that is capable of being used for communication while also using the first beam candidate for communication). By using the first beam candidate to prioritize searching for the second beam candidate, disclosed techniques enable the wireless communication device to reduce latency associated with finding and/or reporting beam candidates by reducing the quantity of beam candidates on which to perform measurements.

FIG. 1 is a diagram illustrating an example of a wireless communications system and an access network 100 including base stations 102 and 180 and UEs 104. The wireless communication system and access network 100 may include one or more UEs 104 in communication with a base station 102 or 180. The wireless communication system and access network 100 may include UEs 104 in communication with other UEs 104. The wireless communication system and access network 100 may include an integrated access and backhaul (IAB) network that includes multiple cells in communication with each other to provide an access network and a backhaul network to a core network such as core network 190 or Evolved Packet Core (EPC) 160. The core network 190 may be a 5G Core (5GC), e.g., a core network that supports new radio (NR) communication or another type of core network. The IAB network may include one or more IAB nodes 103. The IAB nodes may exchange communication with other JAB nodes 103, with a base station 102 or 180, and/or with UEs 104.

In some examples, a wireless communication device, such as a UE 104, the JAB node 103, and/or a base station 102/180, may be configured to manage one or more aspects of wireless communication by facilitating improved searching of a second beam candidate that is full-duplex capable of a first beam candidate. As an example, in FIG. 1, the UE 104, the IAB node 103, and/or the base station 102/180 may include a full-duplex beam searching component 198. In certain aspects, the full-duplex beam searching component 198 may be configured to receive a set of reference signals from a second wireless device. The example full-duplex beam searching component 198 may also be configured to determine a first set of beam-pair links (BPLs) based on the set of reference signals. The example full-duplex beam searching component 198 may also be configured to determine a second set of BPLs based on a capability of full-duplex operation with at least one BPL of the first set of BPLs. The example full-duplex beam searching component 198 may also be configured to perform measurements for the second set of BPLs. The example full-duplex beam searching component 198 may also be configured to communicate using full-duplex operation by transmitting or receiving via a BPL of the first set of BPLs while also performing the other of transmitting or receiving via a BPL of the second set of BPLs.

The aspects presented herein may enable a wireless device to improve communication performance, for example, by reducing a quantity of beams that may be processed for determining full-duplex communication.

Although the following description provides examples directed to 5G NR, the concepts described herein may be applicable to other similar areas, such as LTE, LTE-A, CDMA, GSM, and/or other wireless technologies, in which full-duplex operation may be utilized.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)

(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
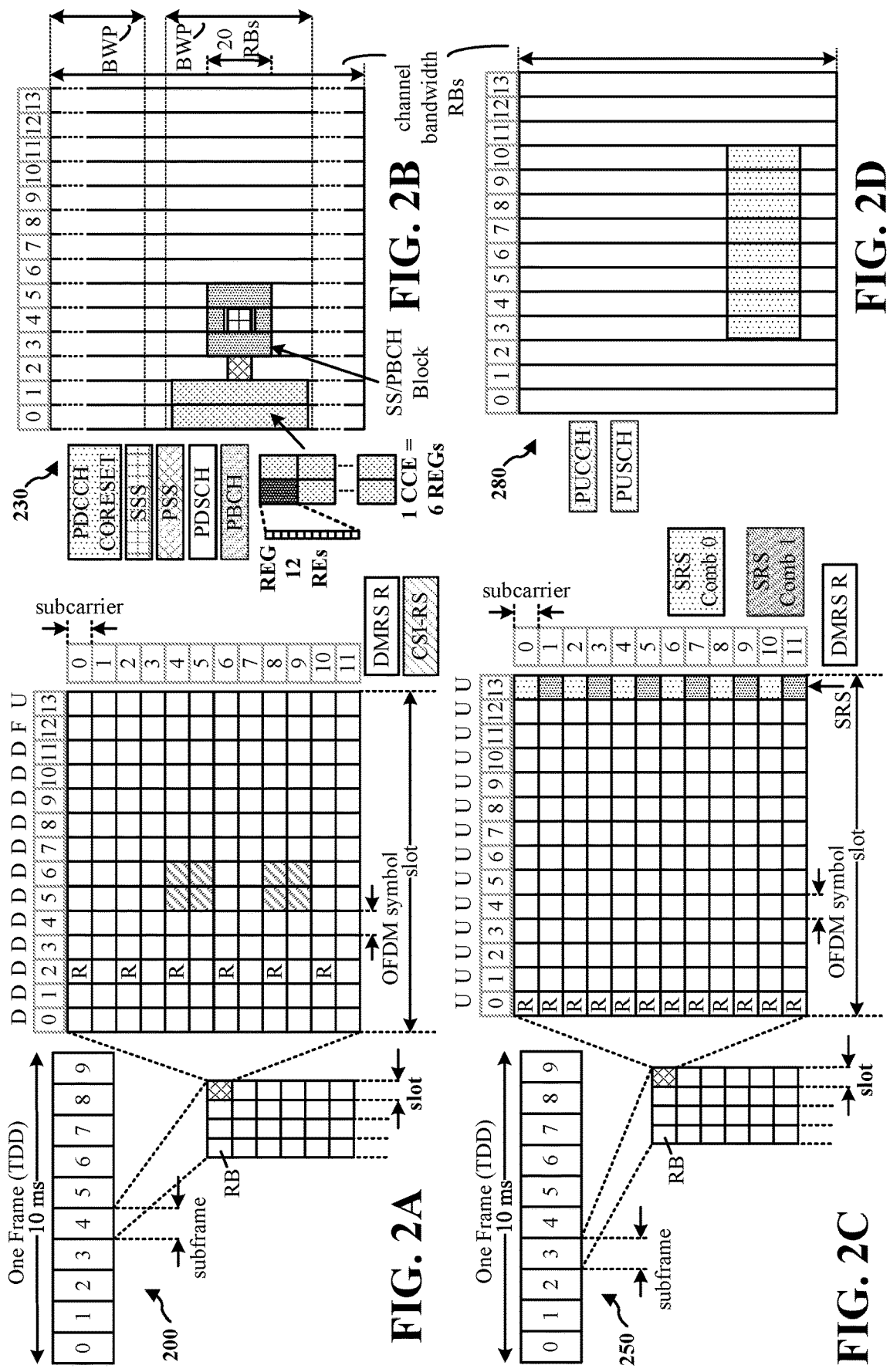
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A to 2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cycle prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2 slots/subframe. The subcarrier spacing may be equal to 24*15 kHz, where y is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
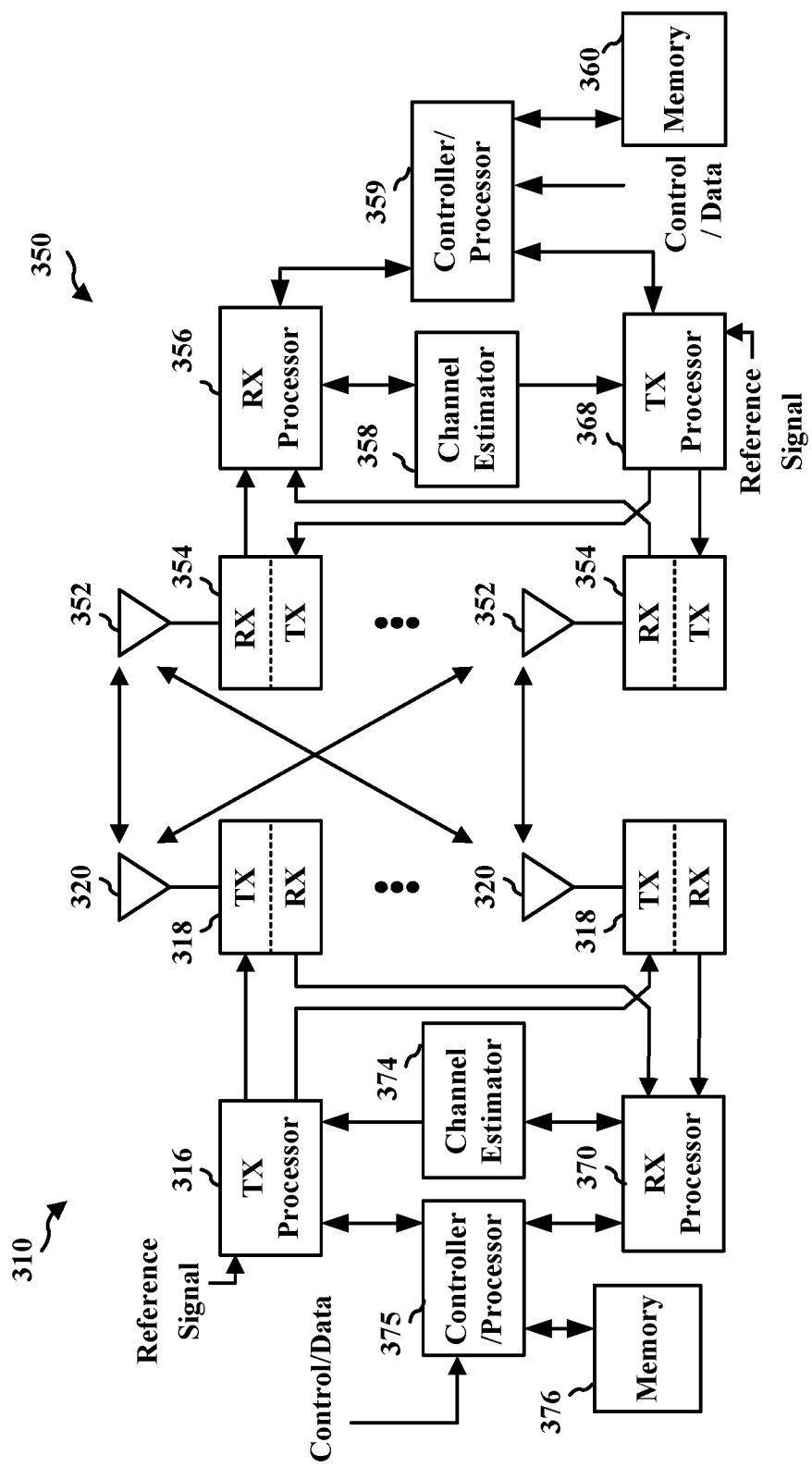
FIG. 3 is a diagram illustrating an example of a base station and a UE in an access network.

FIG. 3 is a block diagram of a first wireless device 310 in communication with a second wireless device 350 in an access network. In some examples, the first wireless device 310 may be a base station in communication with a UE (e.g., the second wireless device 350). In other examples, the first wireless device 310 or the second wireless device 350 may be an IAB node. For example, the first wireless device 310 may be an IAB node and the second wireless device 350 may be a child node or a UE. In other examples, the first wireless device 310 may be a base station, and the second wireless device 350 may be an IAB node. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the second wireless device 350. Each spatial stream may then be provided to a different antenna 320 via a separate transmitter 318 TX. Each transmitter 318 TX may modulate an RF carrier with a respective spatial stream for transmission.

At the second wireless device 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the second wireless device 350. If multiple spatial streams are destined for the second wireless device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless device 310. These soft decisions may be based on channel estimates computed by a channel estimator 358. The soft decisions are then decoded and deinterleaved to recover the data and control signals that were originally transmitted by the first wireless device 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the first wireless device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless device 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the first wireless device 310 in a manner similar to that described in connection with the receiver function at the second wireless device 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the second wireless device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359, and/or the TX processor 316, the RX processor 370, and the controller/processor 375 may be configured to perform aspects in connection with the full-duplex beam searching component 198 of FIG. 1.

Figure 4:
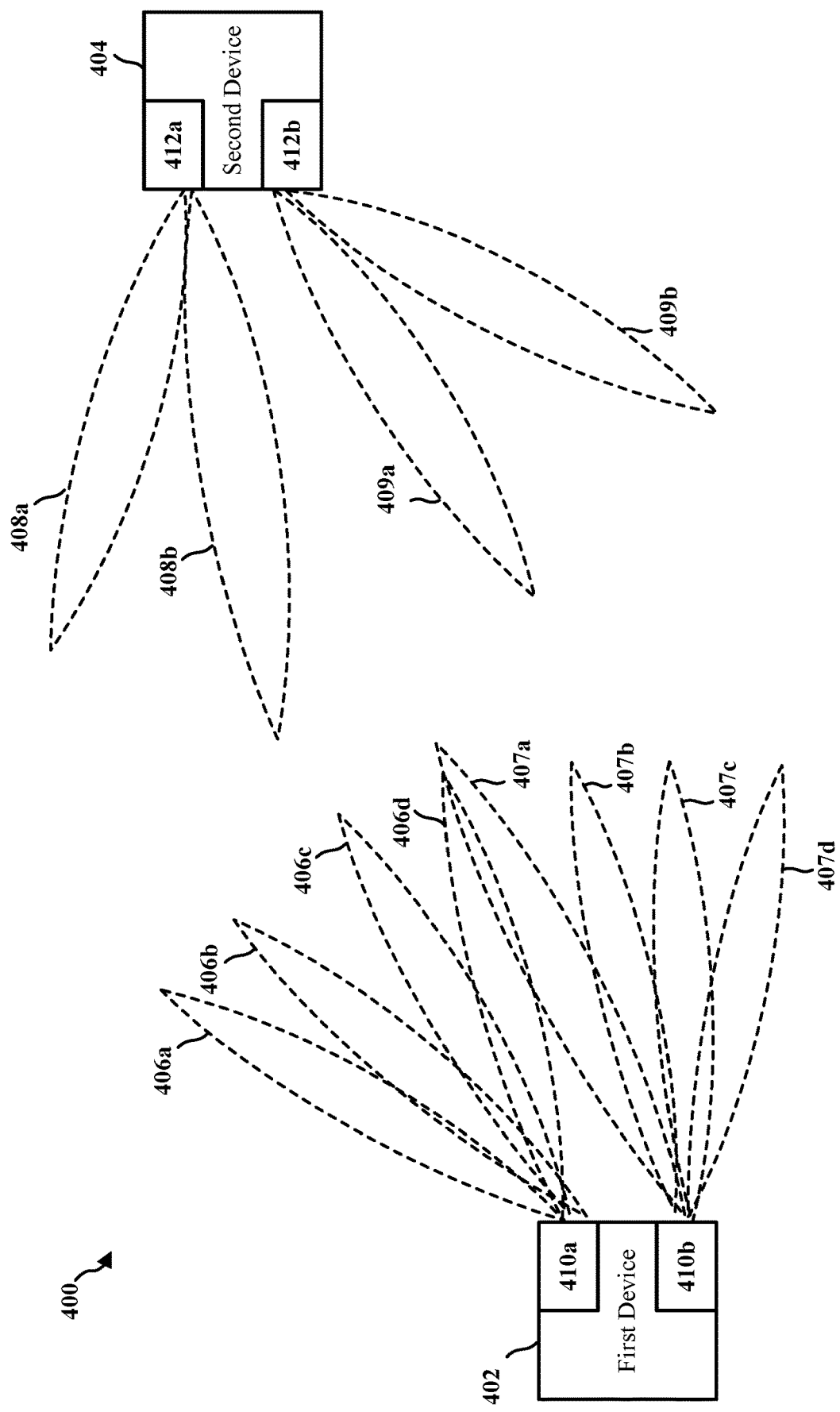
FIG. 4 is a diagram illustrating a first device in communication with a second device.

FIG. 4 is a diagram 400 illustrating a first device 402 in communication with a second device 404. Referring to FIG. 4, the first device 402 may transmit a beamformed signal to the second device 404 in one or more directions 406a, 406b, 406c, 406d, 407a, 407b, 407c, 407d (generally referred to herein as "M beams"). The second device 404 may receive the beamformed signal from the first device 402 in one or more receive directions 408a, 408b, 409a, 409b (generally referred to herein as "N beams"). The second device 404 may also transmit a beamformed signal to the first device 402 in one or more of the directions 408a, 408b, 409a, 409b. The first device 402 may receive the beamformed signal from the second device 404 in one or more of the receive directions 406a, 406b, 406c, 406d, 407a, 407b, 407c, 407d. The first device 402/second device 404 may perform beam training to determine the best receive and transmit directions for each of the first device 402/second device 404. The transmit and receive directions for the first device 402 may or may not be the same. The transmit and receive directions for the second device 404 may or may not be the same.

As used herein, a beam-pair link (BPL) refers to a transmit beam and receive beam pair. For example, a first BPL may include a transmit direction 406c and receive direction 408b pair, and a second BPL may include a transmit direction 409a and receive direction 407c pair.

In the illustrated example of FIG. 4, the first device 402 includes a first set of antennas 410a and a second set of antennas 410b, and the second device 404 includes a first set of antennas 412a and a second set of antennas 412b. In the illustrated example, each of the sets of antennas 410a, 410b, 412a, 412b are associated with a subset of receive and transmit directions associated with the first device 402/second device 404, respectively. For example, the first set of antennas 410a of the first device 402 is associated with receive and transmit directions 406a, 406b, 406c, 406d and the second set of antennas 410b of the first device 402 is associated with receive and transmit directions 407a, 407b, 407c, 407d. Additionally, the first set of antennas 412a of the second device 404 is associated with receive and transmit directions 408a, 408b and the second set of antennas 412b of the second device 404 is associated with receive and transmit directions 409a, 409b. In some examples, a set of antennas may correspond to an antenna panel or an antenna array. In some examples, a set of antennas may correspond to a transmit reception point (TRP).

Although shown as separate sets of antennas, in other examples, the sets of antennas 410a, 410b of the first device 402 and/or the sets of antennas 412a, 412b of the second device 404 may be part of the same set of antennas. For example, the first set of antennas 412a and the second set of antennas 412b of the second device 404 may be implemented by a same antenna panel or a same antenna array.

In the illustrated example of FIG. 4, the first device 402 may be implemented by a base station, such as the base station 102/180, the first wireless device 310, and/or the second wireless device 350, or a distributed unit (DU) node of an integrated access and backhaul (IAB) device. Aspects of the second device 404 may be implemented by a UE, such the UE 104, the first wireless device 310, and/or the second wireless device 350, or a mobile termination (MT) node of an IAB device.

In some examples, one or both of the devices 402, 404 may be capable of full-duplex operation. For example, the second device 404 may be capable of receiving a downlink message using one or more receive directions 408a, 408b, 409a, 409b (or beams) while also transmitting an uplink message using one or more of the transmit directions 408a, 408b, 409a, 409b (or beams). When implementing full-duplex operation, it is beneficial for the device to minimize self-interference. Self-interference may occur when a transmit signal leaks to a receiver port of the device. In some examples, the device may experience self-interference when, for example, a transmit signal is reflected (e.g., by an object) back to a receiver port of the device (sometimes referred to as "clutter echo").

Some example techniques for reducing self-interference include implementing spatial isolation. For example, the receive beams and the transmit beams may be selected to reduce the occurrence of signal leak and/or clutter echo. For example, the receive beams may be selected from the first set of antennas 412a of the second device 404 and the transmit beams may be selected from the second set of antennas 412b. In some examples, the device may employ self-isolation cancellation techniques in the analog and/or digital domain.

In some examples, while a device may be configured to perform full-duplex operation, the device may not be capable of full-duplex communication in some instances. For example, the device may determine that due to self-interference, the device is incapable of transmitting and receiving communications at the same time. In some examples, to determine whether full-duplex communication is available, the device may perform self-interference measurements. For example, while transmitting a signal using a first set of antennas, the device may measure received signals on a second set of antennas. In some such examples, the received signals may be due to leaking transmit signals and/or clutter echo.

In some examples, the wireless device may perform the self-interference measurement autonomously (e.g., without receiving instructions from another device). For example, when a base station (or a DU node) transmits a downlink signal (or a set of downlink signals) (e.g., an SSB, CSI-RS, PT-RS, etc.) using one or more transmit beams or directions, the base station may perform measurements of any of the signals received on one or more receive beams or directions. For example, the first device 402 may transmit a set of downlink reference signals using one or more of the transmit directions 406a, 406b, 406c, 406d (or beams) of the first set of antennas 410a and measure the reference signal received power (RSRP), the reference signal received quality (RSRQ), the signal to noise ratio (SNR), and/or the signal to interference plus noise ratio (SINR) of signals received using one or more of the receive directions 407a, 407b, 407c, 407d (or beams) of the second set of antennas 410b.

In some examples, when a UE (or an MT node) is scheduled to transmit an uplink signal (e.g., SRS), the UE may perform measurements of any signals received on one or more receive beams or directions. For example, the second device 404 may transmit a set of uplink signals (e.g., SRS, etc.) using one or more of the transmit directions 408a, 408b (or beams) of the first set of antennas 412a and measure the quality (e.g., the RSRP, the RSRQ, the SNR, and/or the SINR) of signals received using one or more of the receive directions 409a, 409b (or beams) of the second set of antennas 412b.

In some examples, the network may facilitate the performing of the self-interference measurements. For example, the first device 402 (e.g., a base station or a DU node) may provide configurations and/or resources to the second device 404 (e.g., a UE or an MT node) to perform the self-interference measurements. In some examples, the first device 402 may configure the second device 404 to provide report(s) of the performed self-interference measurements. In some examples, the first device 402 may determine, based on the received report(s), the full-duplex capabilities, conditions for performing full-duplex communications, and/or performance of the second device 404.

FIGS. 5 to 9 illustrate example communication systems for implementing full-duplex communication using at least one full-duplex capable device.

Figure 5:
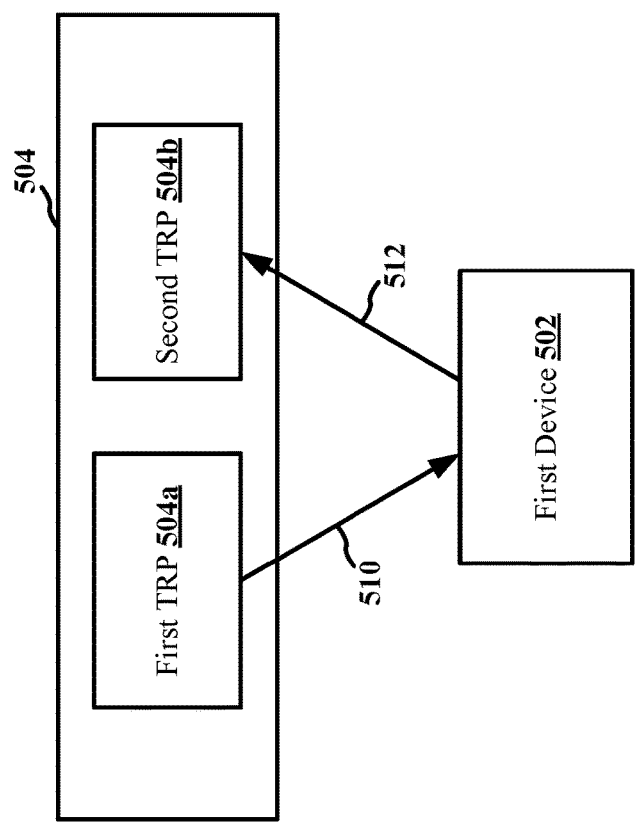
FIG. 5 illustrates a communication system including a first device in communication with a second device, in accordance with one or more techniques disclosed herein.

FIG. 5 illustrates a communication system 500 including a first device 502 in communication with a second device 504. Aspects of the second device 504 may be implemented by the first device 402 of FIG. 4. For example, the second device 504 may be implemented by a base station or a DU node of an IAB device. In the illustrated example of FIG. 5, the second device 504 includes a first TRP (TRP1) 504a and a second TRP (TRP2) 504b. For example, the first TRP 504a may be implemented by the first set of antennas 410a of the first device 402 and the second TRP 504b may be implemented by the second set of antennas 410b of the first device 402 of FIG. 4. Aspects of the first device 502 may be implemented by the second device 404 of FIG. 4. For example, the first device 502 may be implemented by a UE or an MT node.

In the illustrated example of FIG. 5, at least the first device 502 is capable of full-duplex communication. For example, the first device 502 may receive a downlink signal 510 from the first TRP 504a while also transmitting an uplink signal 512 to the second TRP 504b. The example second device 504 may be capable of half-duplex communication (e.g., capable of either transmitting or receiving, but not both, at a time) or full-duplex communication.

Figure 6:
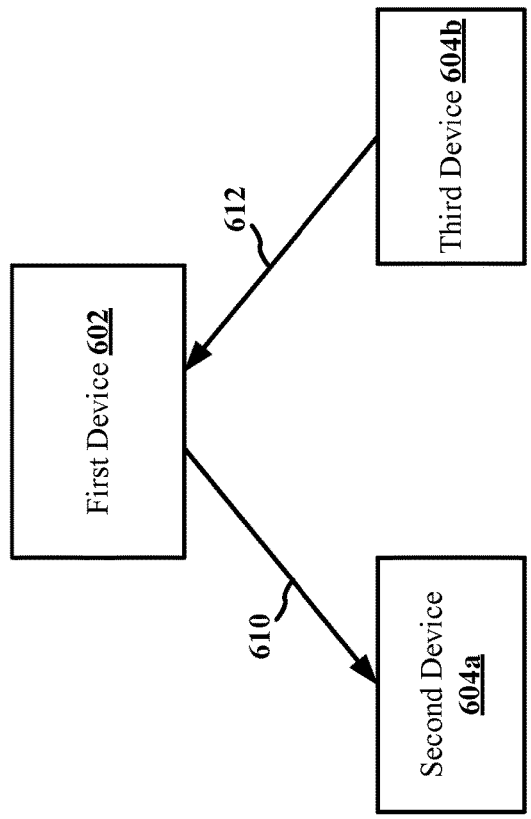
FIG. 6 illustrates a communication system including a first device in communication with second and third devices, in accordance with one or more techniques disclosed herein.
Figure 7:
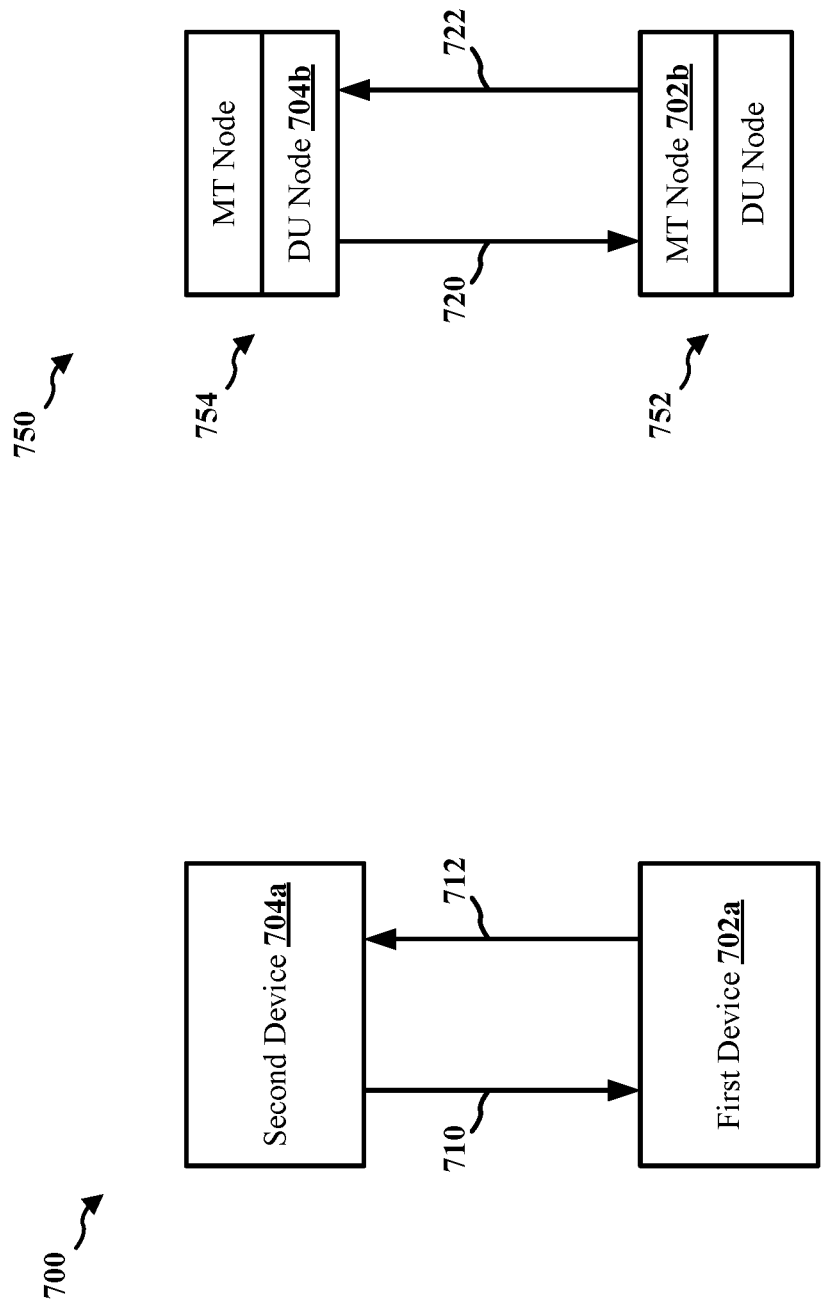
FIG. 7A illustrates an example communication system including a first device, such as a UE, in communication with a second device, such as a base station, in accordance with one or more techniques disclosed herein.
FIG. 7B illustrates an example communication system including a first device, such as a mobile termination node, in communication with a second device, such as a distributed unit node, in accordance with one or more techniques disclosed herein.

FIG. 6 illustrates a communication system 600 including a first device 602 in communication with second and third devices 604a, 604b. Aspects of the first device 602 may be implemented by the first device 402 of FIG. 4. For example, the first device 602 may be implemented by a base station or a DU node of an IAB device. Aspects of the second and third devices 604a, 604b may be implemented by the second device 404 of FIG. 4. For example, the second device 604a may be implemented by a UE or an MT node.

In the illustrated example of FIG. 6, at least the first device 602 is capable of full-duplex communication. For example, the first device 602 may transmit a downlink signal 610 to the second device 604a while also receiving an uplink signal 612 from the third device 604b. The second and third devices 604a, 604b may be capable of half-duplex communication or full-duplex communication.

FIGS. 7A and 7B illustrate communication systems 700, 750, respectively, including a first device 702a, 702b in communication with a second device 704a, 704b. Aspects of the second device 704a, 704b may be implemented by the first device 402 of FIG. 4. For example, the second device 704a, 704b may be implemented by a base station or a DU node of an IAB device. Aspects of the first device 702a, 702b may be implemented by the second device 404 of FIG. 4. For example, the first device 702a, 702b may be implemented by a UE or an MT node of an IAB device. In the illustrated example of FIG. 7A, the first device 702a is implemented by a UE and the second device 704a is implemented by a base station. In the illustrated example of FIG. 7B, the first device 702b is implemented by an MT node (e.g., of an IAB device 752) and the second device 704b is implemented by a DU node (e.g., of an IAB device 754).

In the illustrated examples of FIGS. 7A and 7B, the first devices 702a, 702b and the second devices 704a, 704b are each capable of full-duplex communication. For example, the second device 704a of FIG. 7A (e.g., a base station) may transmit a downlink signal 710 using a first set of transmit beams or directions while also receiving an uplink signal 712 using a second set of receive beams or directions. The first device 702a of FIG. 7A (e.g., a UE) may receive the downlink signal 710 using a first set of receive beams or directions while also transmitting the uplink signal 712 using a second set of transmit beams or directions.

In the illustrated example of FIG. 7B, the second device 704b (e.g., a DU node) may transmit a downlink signal 720 using a first set of transmit beams or directions while also receiving an uplink signal 722 using a second set of receive beams or directions. The first device 702b (e.g., an MT node) may receive the downlink signal 720 using a first set of receive beams or directions while also transmitting the uplink signal 722 using a second set of transmit beams or directions.

Figure 8:
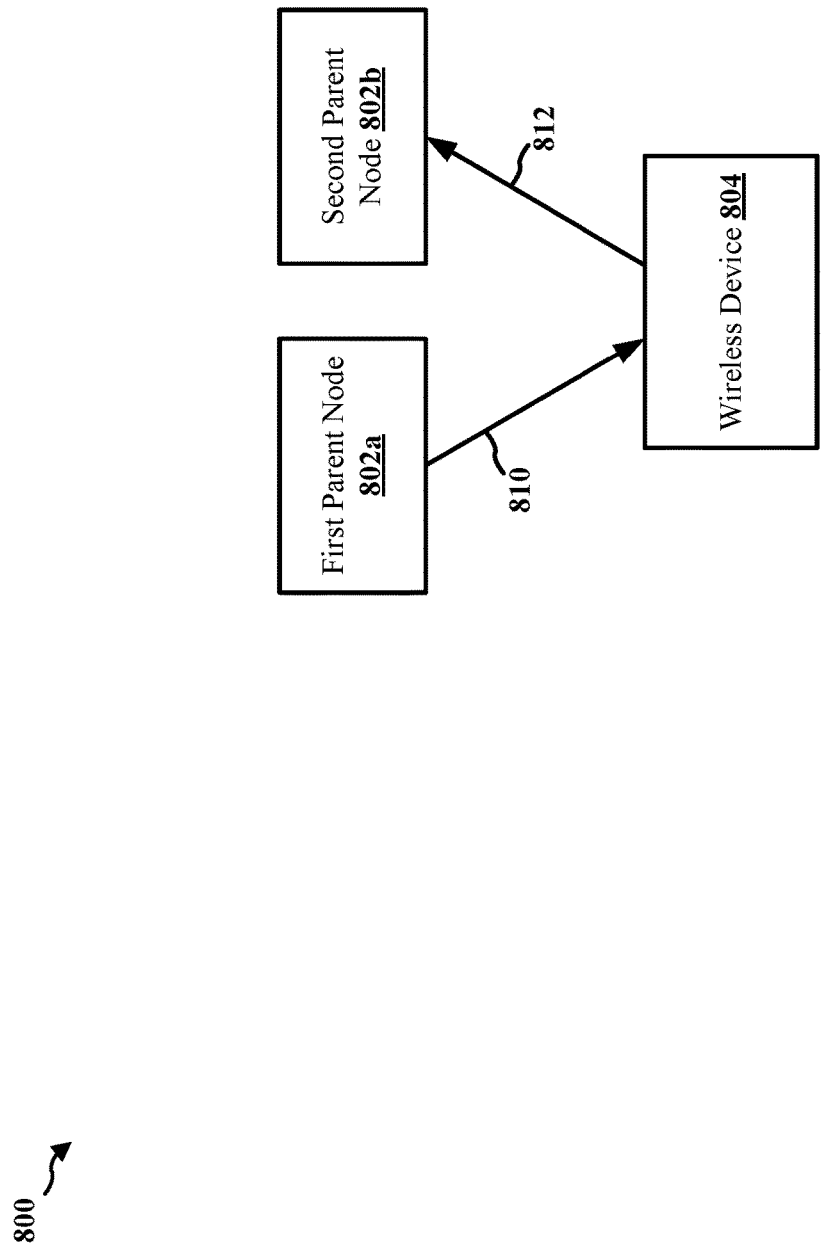
FIG. 8 illustrates an example communication system including parent nodes in communication with a wireless device, in accordance with one or more techniques disclosed herein.

FIG. 8 illustrates a communication system 800 including parent nodes 802a, 802b in communication with a wireless device 804. Aspects of the parent nodes 802a, 802b may be implemented by the first device 402 of FIG. 4. For example, one or both of the parent nodes 802a, 802b may be implemented by a base station and/or a DU node of an IAB device. Aspects of the wireless device 804 may be implemented by the second device 404 of FIG. 4. For example, the wireless device 804 may be implemented by a UE or an MT node.

In the illustrated example of FIG. 8, the wireless device 804 is dual-connected with the parent nodes 802a, 802b. In some examples, the connection between the wireless device 804 and a first parent node 802a and the connection between the wireless device 804 and a second parent node 802b may be in the same frequency band.

In the illustrated example of FIG. 8, at least the wireless device 804 is capable of full-duplex communication. For example, the wireless device 804 may receive a downlink signal 810 from the first parent node 802a while also transmitting an uplink signal 812 to the second parent node 802b. It may be appreciated that one or both of the parent nodes 802a, 802b may be capable of half-duplex communication or full-duplex communication.

Figure 9B:
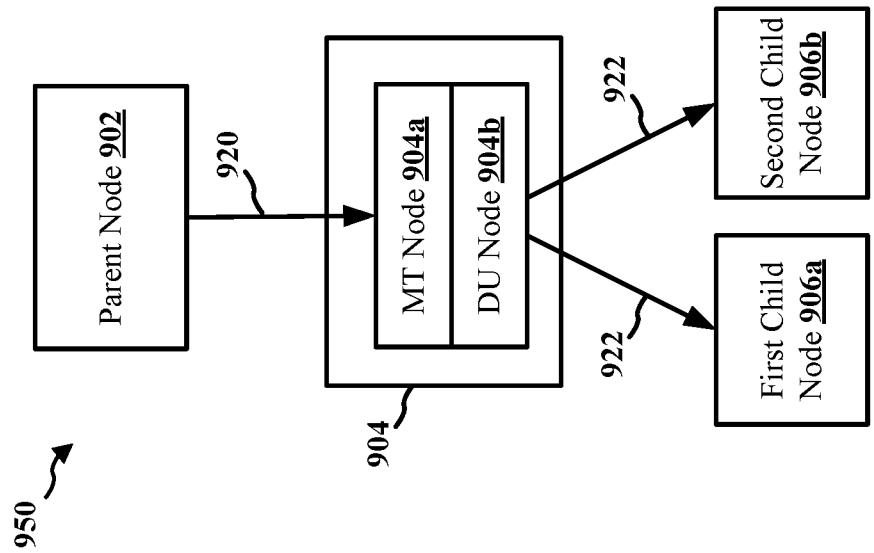
FIG. 9B illustrates another example communication system including a parent node, an IAB device, and child nodes, in accordance with one or more techniques disclosed herein.
Figure 9A:
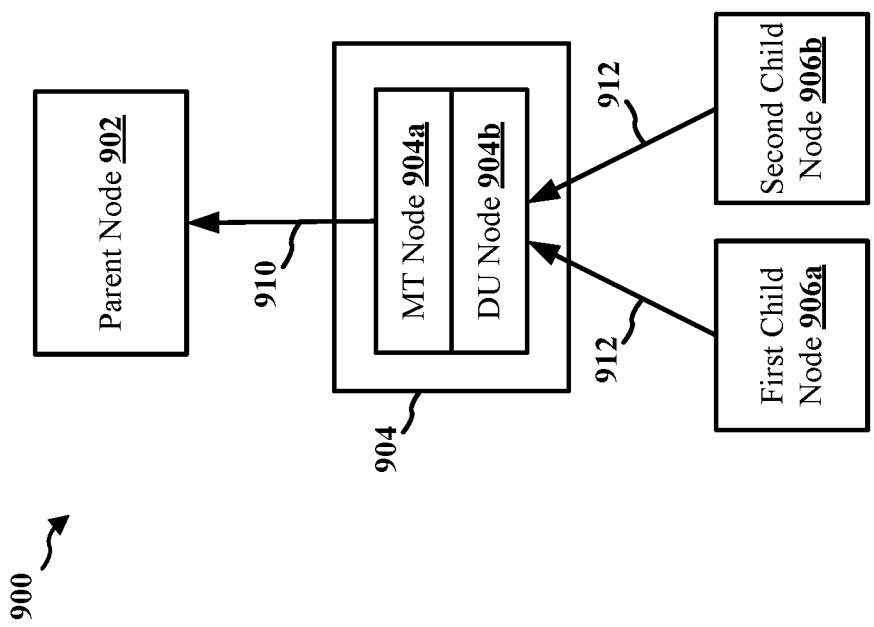
FIG. 9A illustrates an example communication system including a parent node, an integrated access and backhaul (IAB) device, and child nodes, in accordance with one or more techniques disclosed herein.

FIGS. 9A and 9B illustrate communication systems 900, 950, respectively, including a parent node 902, an IAB device 904, and child nodes 906a, 906b. Aspects of the parent node 902 may be implemented by the first device 402 of FIG. 4. For example, the parent node 902 may be implemented by a base station and/or a DU node of an IAB device. Aspects of the child nodes 906a, 906b may be implemented by the second device 404 of FIG. 4. For example, one or both of the child nodes 906a, 906b may be implemented by a UE or an MT node.

In the illustrated example of FIGS. 9A and 9B, the IAB device 904 includes an MT node 904a and a DU node 904b. The MT node 904a may transmit a communication 910 to the parent node 902 (as shown in FIG. 9A) or may receive a communication 920 from the parent node 902 (as shown in FIG. 9B). The DU node 904b may receive a communication 912 from one or both of the child nodes 906a, 906b (as shown in FIG. 9A) or may transmit a communication 922 to one or both of the child nodes 906a, 906b (as shown in FIG. 9B).

In some examples, the MT node 904a may be associated with a first set of antennas, such as the example first set of antennas 412a of the second device 404 of FIG. 4, and the DU node 904b may be associated with a second set of antennas, such as the example second set of antennas 410b of the first device 402 of FIG. 4.

In the illustrated examples of FIGS. 9A and 9B, the IAB device 904 is capable of full-duplex communication. For example, in the illustrated example of FIG. 9A, the DU node 904b of the IAB device 904 may transmit the communication 910 to the parent node 902 while the MT node 904a of the IAB device 904 also receives the communication 912 from one or both of the child nodes 906a, 906b. In the illustrated example of FIG. 9B, the DU node 904b of the IAB device 904 may receive the communication 920 from the parent node 902 while the MT node 904a of the IAB device 904 also transmits the communication 922 to one or both of the child nodes 906a, 906b. The parent node 902, a first child node 906a, and/or a second child node 906b may be capable of half-duplex communication or full-duplex communication.

As described above, to operate in full-duplex mode, a device uses one or more transmit beams or directions for transmitting a signal while also using one or more receive beams or directions for receiving a signal. For example, a device may identify two or more beams that are capable of being used for communication and that may also be used for full-duplex communication at the device and/or at the other device. In some examples, the device may determine the two or more beams that are capable of being used for communication by comparing a signal quality (e.g., a measured RSRP, a measured RSRQ, a measured SNR, and/or a measured SINR) of a plurality of beams to a quality threshold and selecting those beams with a measured signal quality that satisfy the quality threshold. In some examples, the device may then determine which of the determined two or more beams capable of being used for communication are also capable of full-duplex communication. In some examples, the device may determine that beams are capable of full-duplex communication based on self-interference measurements and/or cross-link interference measurements. Cross-link interference may refer to instances in which two devices are relatively proximate and/or overlap in beams, such as with respect to the parent nodes 802a, 802b of FIG. 8.

To facilitate full-duplex communication, example techniques disclosed herein enable the wireless device to reduce the quantity of beams that may be processed for determining full-duplex communication. For example, disclosed techniques enable identifying a first beam candidate and then prioritizing the searching of a subset of beam candidates for a beam candidate that is capable of full-duplex communication with respect to the first beam candidate (e.g., a second beam candidate of the subset of beam candidates that may be used for communicating while also communicating using the first beam candidate). It may be appreciated that the first beam candidate may refer to one or more beam candidates.

For example, the wireless device may identify a first BPL comprising a receive beam or direction of the wireless device and a transmit beam or direction of a transmitting wireless device. Referring to the illustrated example of FIG. 4, the second device 404 may identify a first BPL comprising a transmit direction 406c (or beam) of the first device 402 and a receive direction 408b (or beam) of the second device 404. The second device 404 may then prioritize searching a subset of BPLs that are capable of full-duplex communication with the first BPL. For example, receive directions 408a, 408b (or beams) associated with the first set of antennas 412a may be incapable of being used for full-duplex communication with transmit directions 409a, 409b (or beams) associated with the second set of antennas 412b. In some such examples, after determining the first BPL comprises the receive beam or direction 408b, the second device 404 may prioritize searching for a transmit beam or direction 409a, 409b of the second set of antennas 412b that is capable of being used for communicating and also capable of full-duplex communication. In this manner, disclosed techniques enable a wireless device, such as the second device 404, to reduce the quantity of beams or directions that are searched for identifying a second BPL after identifying a first BPL.

Although the above description provides an example in which the second device 404 uses the receive beams or directions associated with the first BPL for prioritizing the search for the second BPL, in other examples, the second device 404 may additionally or alternatively use the transmit beams or directions associated with the first BPL for prioritizing the search for the second BPL. For example, the first device 402 may assign different transmit directions 406a, 406b, 406c, 406d, 407a, 407b, 407c, 407d (or beams) for transmitting different reference signals. In some such examples, the second device 404 may use the transmit beam or direction of the first BPL (e.g., the transmit direction 406c used by the first device 402 to transmit a downlink reference signal) to determine a subset of receive directions 406a, 406b, 406c, 406d, 407a, 407b, 407c, 407d (or beams) of the first device 402 and/or a subset of transmit directions 408a, 408b, 409a, 409b (or beams) of the second device 404 that may be used for full-duplex communication with the first BPL.

Additionally, although the above description provides an example in which the second device 404 performs the identifying of the first BPL and the second BPL for full-duplex communication, in other examples, the first device 402 may additionally or alternatively perform the identifying of the first BPL and the second BPL for full-duplex communication.

Figure 10:
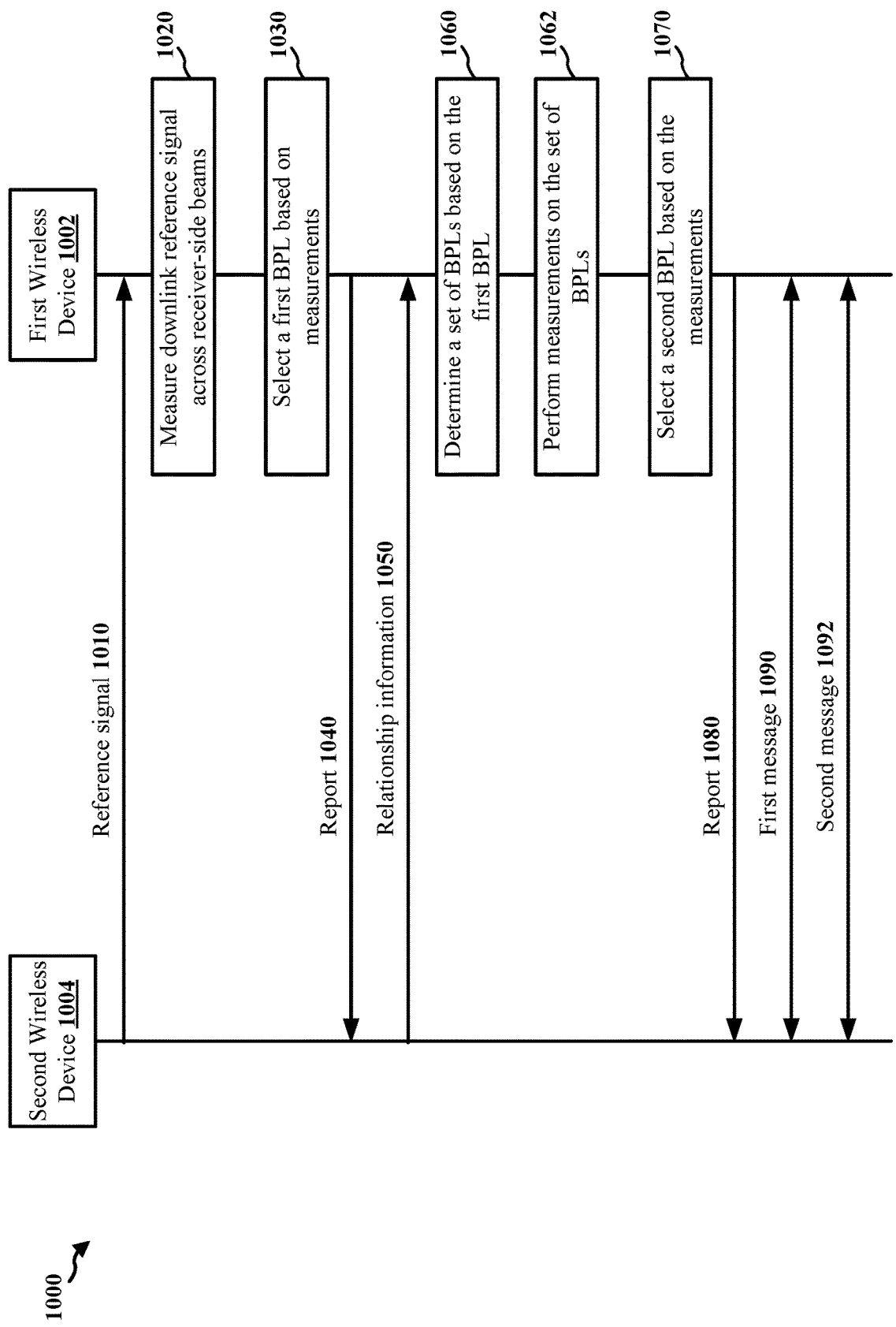
FIG. 10 is an example communication flow between a first communication device and a second communication device, in accordance with the teachings disclosed herein.

FIG. 10 illustrates an example wireless communication flow 1000 between a first wireless device 1002 and a second wireless device 1004, as presented herein. In the illustrated example of FIG. 10, the wireless communication flow 1000 may facilitate full-duplex communication by a full-duplex capable UE or a full-duplex capable MT node in communication with a base station or DU node including two sets of antennas (e.g., the example communication system 500 of FIG. 5), a full-duplex capable UE or a full-duplex capable MT node in communication with a full-duplex capable base station or a full-duplex capable DU node (e.g., the example communication systems 700, 750 of FIGS. 7A and 7B).

One or more aspects of the second wireless device 1004 may be implemented by the base station 102/180 of FIG. 1, the first wireless device 310 or the second wireless device 350 of FIG. 3, the first device 402 of FIG. 4, the second device 504 of FIG. 5, and/or the second devices 704a, 704b of FIGS. 7A and 7B. One or more aspects of the first wireless device 1002 may be implemented by the UE 104 of FIG. 1, the first wireless device 310 or the second wireless device 350 of FIG. 3, the second device 404 of FIG. 4, the first device 502 of FIG. 5, and/or the first devices 702a, 702b of FIGS. 7A and 7B.

While the wireless communication flow 1000 of FIG. 10 includes the first wireless device 1002 in communication with the second wireless device 1004, in additional or alternative examples, the first wireless device 1002 may be in communication with any suitable quantity of base stations, DU nodes, UEs, and/or MT nodes, and/or the second wireless device 1004 may be in communication with any suitable quantity of base stations, DU nodes, UEs, and/or MT nodes. Thus, while certain of the transmissions between the first wireless device 1002 and the second wireless device 1004 are described as uplink transmissions and downlink transmissions, in other examples, any of the transmissions may additionally or alternatively be sidelink transmissions.

In the illustrated example of FIG. 10, the second wireless device 1004 transmits a reference signal 1010 that is received by the first wireless device 1002. The reference signal 1010 may comprise a set of reference signals. For example, the reference signal 1010 may include any suitable combination of one or more SSBs, one or more CSI-RS, and/or one or more PT-RS (e.g., for a set of downlink reference signals), or one or more SRS (e.g., for a set of uplink reference signals). In some examples, the second wireless device 1004 may transmit the reference signal 1010 using different transmit beams or directions.

At 1020, the first wireless device 1002 measures the reference signal 1010 across receiver-side beams. For example, the first wireless device 1002 may perform quality measurements of the reference signal 1010 across one or more of the receive directions 408a, 408b, 409a, 409b of FIG. 4 (or beams). In some examples, the quality measurements may include measuring the RSRP, the RSRQ, the SNR, and/or the SINR of the reference signal 1010 across the one or more receive directions 408a, 408b, 409a, 409b (or beams).

At 1030, the first wireless device 1002 selects a first BPL based on the measurements (e.g., at 1020). For example, the first wireless device 1002 may select a pair of beams or directions including a transmit beam or direction of the second wireless device 1004 (e.g., one of the directions 406a, 406b, 406c, 406d, 407a, 407b, 407c, 407d (or beams)) and a receive beam or direction of the first wireless device 1002 (e.g., one of the directions 408a, 408b, 409a, 409b (or beams)) with a quality measurement (e.g., a measured RSRP, a measured RSRQ, a measured SNR, and/or a measured SINR) that satisfies a quality threshold. The first BPL may include a set of one or more BPLs.

In some examples, the first wireless device 1002 may transmit a report 1040 that is received by the second wireless device 1004. The report 1040 may include the first BPL (e.g., selected at 1030). In some examples, the report 1040 may include information regarding candidate BPLs that are full-duplex capable with the first BPL. In such examples, the candidate BPLs may not be evaluated yet (e.g., at 1062) and, thus, may be incapable of being used for communication. In some examples, the report 1040 may include information regarding disqualified BPLs that are incapable of being used for full-duplex communication with the first BPL.

In some examples, the second wireless device 1004 may transmit relationship information 1050 that is received by the first wireless device 1002. The relationship information 1050 may include information that enables the first wireless device 1002 to determine the subset of BPLs to evaluate (e.g., at 1060 and 1062) instead of evaluating the full set of candidate BPLs available to the first wireless device 1002.

In some examples, the relationship information 1050 may include information regarding full-duplex capable beams or directions (e.g., regarding beams or directions that facilitate full-duplex communication). For example, the relationship information 1050 may include information regarding which reference signal(s) are assigned to which set(s) of antennas (e.g., to different TRPs, to different antenna arrays, to different antenna panels, etc.).

In some examples, the relationship information 1050 may include information regarding which reference signal(s) are full-duplex capable. For example, the relationship information 1050 may indicate that a first set of reference signals are full-duplex capable with a second set of reference signals. In such examples, if the first wireless device 1002 selects the first BPL (e.g., at 1030) based on the first set of reference signals, then the first wireless device 1002 may select the subset of BPLs to evaluate (e.g., at 1060 and 1062) based on the second set of reference signals.

In some examples, the relationship information 1050 may include general information regarding full-duplex capable beams or directions. For example, the relationship information 1050 may include a first set of transmit beams or directions that are full-duplex capable with a second set of transmit beams or directions. In some examples, the relationship information 1050 may be based on the report 1040. For example, the relationship information 1050 may identify the subset of BPLs that are full-duplex capable with the first BPL included in the report 1040.

At 1060, the first wireless device 1002 determines a set of BPLs based on the first BPL. For example, the first wireless device 1002 may use the transmitter-side beam or direction and/or the receiver-side beam or direction of the first BPL to determine a set of BPLs with transmitter-side beams or directions and/or receiver-side beams or directions that are full-duplex capable with the first BPL. The set of BPLs may comprise one or more BPLs.

In some examples, the first wireless device 1002 may use the receiver-side beam or direction of the first BPL (e.g., the receive beam or direction of the first wireless device 1002) to determine the set of BPLs. For example, the first wireless device 1002 may determine the set of transmit directions 408*a*, 408*b*, 409*a*, 409*b* (or beams) that are full-duplex capable with the receive beam or direction of the first BPL. For example, the first wireless device 1002 may determine that the receive beam or direction is associated with the first set of antennas 412*a* of the first wireless device 1002 and determine the subset of transmit beams or directions that are associated with the second set of antennas 412*b*.

In some examples, the first wireless device 1002 may use the transmitter-side beam or direction of the first BPL (e.g., the transmit beam or direction of the second wireless device 1004) to determine the set of BPLs. For example, the first wireless device 1002 may use the transmit beam or direction of the second wireless device 1004 of the first BPL to determine the set of receive directions 408*a*, 408*b*, 409*a*, 409*b* (or beams) that are full-duplex capable with the transit beam or direction of the first BPL and/or may determine the set of transmit directions 408*a*, 408*b*, 409*a*, 409*b* (or beams) that are full-duplex capable with the receive beam or direction of the first BPL.

In some examples, the first wireless device 1002 may use the relationship information 1050 to determine the set of BPLs. For example, the first wireless device 1002 may use the relationship information 1050 to determine the set of BPLs by identifying the set of beams or directions that satisfy the relationship information 1050 based on the first BPL.

In some examples, the relationship information 1050 may include information regarding a set of BPLs that are full-duplex capable with the first BPL. For example, the second wireless device 1004 may transmit the relationship information 1050 based on the report 1040 including the first BPL. The first wireless device 1002 may use the relationship information 1050 to determine the subset of BPLs accordingly.

Although the example of FIG. 10 illustrates the second wireless device 1004 transmitting the relationship information 1050 after receiving the report 1040, in other examples, the second wireless device 1004 may transmit the relationship information 1050 prior to receiving the report 1040. For example, the second wireless device 1004 may provide relationship information 1050 (e.g., general relationship information) to the first wireless device 1002 when establishing a connection with the first wireless device 1002 and/or may reconfigure the first wireless device 1002 with the relationship information 1050 after establishing the connection.

At 1062, the first wireless device 1002 performs measurements on the set of BPLs. For example, the first wireless device 1002 may perform RSRP measurements, RSRQ measurements, SNR measurements, and/or SINR measurements for the set of BPLs (e.g., the set of BPLs determined at 1060).

At 1070, the first wireless device 1002 selects a second BPL based on the evaluations (e.g., at 1062). For example, the first wireless device 1002 may select a pair of beams or directions including a receive beam or direction of the second wireless device 1004 (e.g., one of the directions 406*a*, 406*b*, 406*c*, 406*d*, 407*a*, 407*b*, 407*c*, 407*d* (or beams)) and a transmit beam or direction of the first wireless device 1002 (e.g., one of the directions 408*a*, 408*b*, 409*a*, 409*b* (or beams)) with a quality measurement (e.g., a measured RSRP, a measured RSRQ, a measured SNR, and/or a measured SINR) that satisfies a quality threshold. The second BPL may include a set of one or more BPLs.

In some examples, the first wireless device 1002 may transmit a report 1080 that is received by the second wireless device 1004. The report 1080 may include the first BPL (e.g., selected at 1039) and/or the second BPL (e.g., selected at 1070). In some examples, the report 1080 may include additional or alternate candidate BPLs that may be used for full-duplex communication. In some examples, the report 1080 may include additional or alternative disqualified BPLs that are not full-duplex capable with the first BPL.

In the illustrated example of FIG. 10, the first wireless device 1002 performs full-duplex communication with the second wireless device 1004. For example, the first wireless device 1002 may receive a first message 1090 from the second wireless device 1004 using the first BPL. The first wireless device 1002 may also transmit a second message 1092 that is received by the second wireless device 1004 using the second BPL.

The receiving of the first message 1090 and the transmitting of the second message 1092 may be performed simultaneously (or nearly simultaneous) so that the first wireless device 1002 is employing full-duplex communication.

Figure 11:
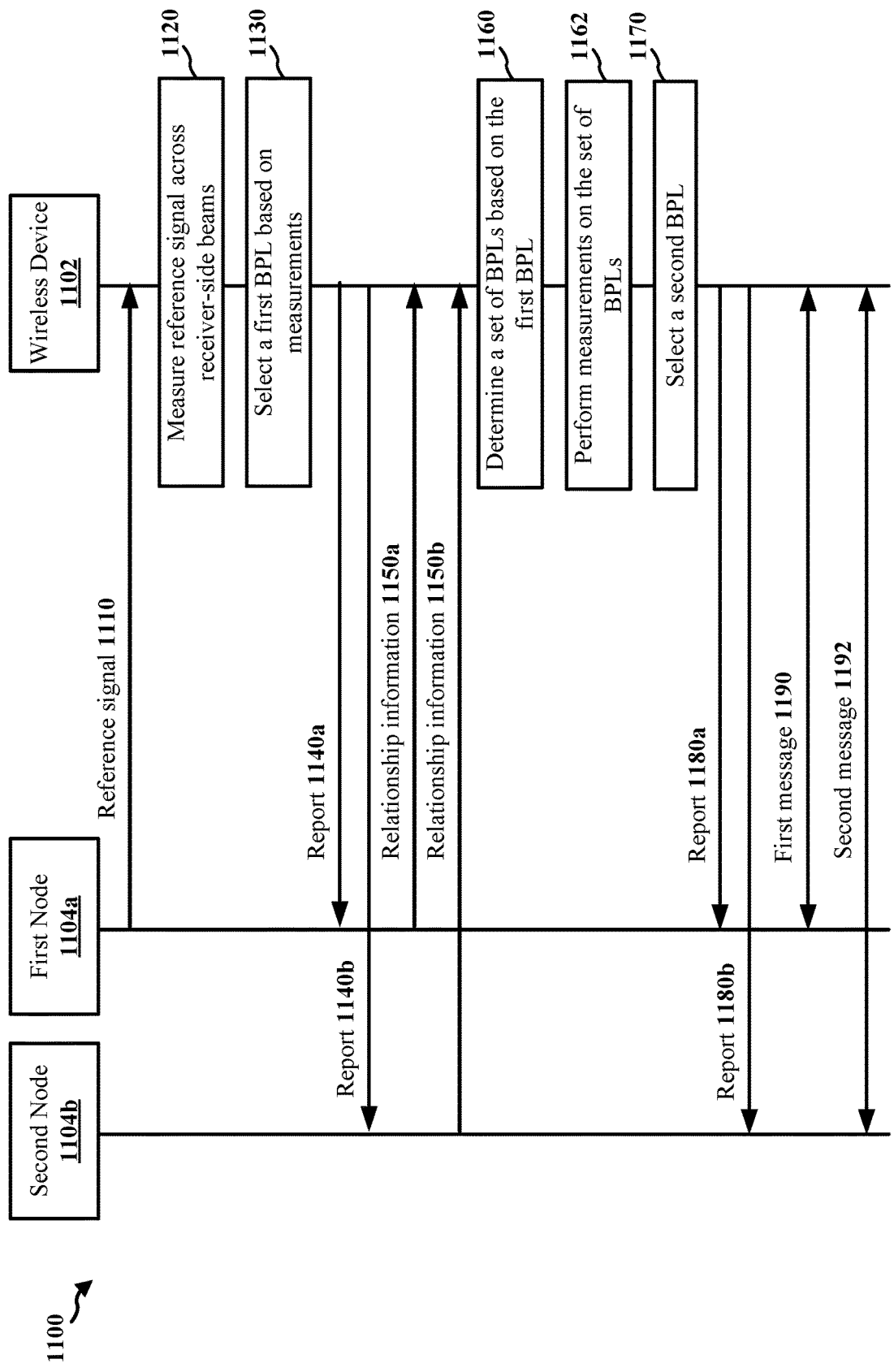
FIG. 11 is an example communication flow between a wireless device, a first parent node, and a second parent node, in accordance with one or more techniques disclosed herein.

FIG. 11 illustrates an example wireless communication flow 1100 between nodes 1104a, 1104b and a wireless device 1102, as presented herein. In some examples, the wireless communication flow 1100 may facilitate full-duplex communication by a full-duplex capable UE or a full-duplex capable MT node in dual connectivity with a first node 1104a and a second node 1104b (e.g., the example communication system 800 of FIG. 8). One or more aspects of the nodes 1104a, 1104b may be implemented by the base station 102/180 of FIG. 1, the first wireless device 310 or the second wireless device 350 of FIG. 3, the first device 402 of FIG. 4, and/or the parent nodes 802a, 802b of FIG. 8. One or more aspects of the wireless device 1102 may be implemented by the UE 104 of FIG. 1, the first wireless device 310 or the second wireless device 350 of FIG. 3, the second device 404 of FIG. 4, and/or the wireless device 804 of FIG. 8.

In the illustrated example of FIG. 11, the first node 1104a transmits a reference signal 1110 that is received by the wireless device 1102. The reference signal 1110 may include a set of reference signals. For example, the reference signal 1110 may include any suitable combination of one or more SSBs, one or more CSI-RS, and/or one or more PT-RS (e.g., for a set of downlink reference signals), or one or more SRS (e.g., for a set of uplink reference signals). In some examples, the first node 1104a may transmit the reference signal 1110 using different transmit beams or directions.

At 1120, the wireless device 1102 measures the reference signal 1110 across receiver-side beams. For example, the wireless device 1102 may perform quality measurements of the reference signal 1110 across one or more of the receive directions 408a, 408b, 409a, 409b of FIG. 4 (or beams). In some examples, the quality measurements may include measuring the RSRP, the RSRQ, the SNR, and/or the SINR of the reference signal 1110 across the one or more receive directions 408a, 408b, 409a, 409b (or beams).

At 1130, the wireless device 1102 selects a first BPL based on the measurements (e.g., at 1120). For example, the wireless device 1102 may select a pair of beams or directions including a transmit beam or direction of the first node 1104a and a receive beam or direction of the wireless device 1102 with a quality measurement (e.g., a measured RSRP, a measured RSRQ, a measured SNR, and/or a measured SINR) that satisfies a quality threshold. The first BPL may include a set of one or more BPLs.

In some examples, the wireless device 1102 may transmit a report 1140a that is received by the first node 1104a and/or may transmit a report 1140b that is received by the second node 1104b. The reports 1140a, 1140b may include the first BPL (e.g., selected at 1130). In some examples, the reports 1140a, 1140b may include information regarding candidate BPLs associated with the second node 1104b that are full-duplex capable with the first BPL associated with the first node 1104a. In such examples, the candidate BPLs may not be evaluated yet (e.g., at 1162) and, thus, may not be capable of being used for communication. In some examples, the reports 1140a, 1140b may include information regarding candidate BPLs associated with the second node 1104b with cross-link interference with the first BPL that is less than an interference threshold. In some examples, the reports 1140a, 1140b may include information regarding disqualified BPLs associated with the second node 1104b (e.g., BPLs that are incapable of being used for full-duplex communication with the first BPL associated with the first node 1104a).

In some examples, the first node 1104a may transmit relationship information 1150a that is received by the wireless device 1102 and/or the second node 1104b may transmit relationship information 1150b that is received by the wireless device 1102. The relationship information 1150a, 1150b may include information that enables the wireless device 1102 to determine a set of BPLs associated with the second node 1104b to evaluate (e.g., at 1160 and 1162) instead of evaluating the full set of candidate BPLs available to the wireless device 1102.

In some examples, the relationship information 1150a, 1150b may include information regarding full-duplex capable beams or directions. For example, the relationship information 1150a, 1150b may identify a set of transmit beams or directions of the wireless device 1102 that are full-duplex capable with a set of receive beams or directions of the wireless device 1102. In some examples, the relationship information 1150a, 1150b may include information regarding which reference signal(s) are assigned to which set(s) of antennas (e.g., to different TRPs, to different antenna arrays, to different antenna panels, etc.).

In some examples, the relationship information 1150a, 1150b may include information regarding which reference signal(s) are full-duplex capable. For example, the relationship information 1150a, 1150b may indicate that a first set of reference signals are full-duplex capable with a second set of reference signals. In such examples, if the wireless device 1102 selects the first BPL (e.g., at 1130) based on the first set of reference signals, then the wireless device 1102 may select a set of BPLs to evaluate (e.g., at 1160 and 1162) based on the second set of reference signals.

In some examples, the relationship information 1150a, 1150b may include general information regarding full-duplex capable beams or directions. For example, the relationship information 1150a, 1150b may include a first set of transmit beams or directions that are full-duplex capable with a second set of transmit beams or directions. In some examples, the relationship information 1150a, 1150b may be based on the reports 1140a, 1140b. For example, the relationship information 1150a, 1150b may identify the set of BPLs that are full-duplex capable with the first BPL. In some examples, the relationship information 1150a, 1150b may identify one or more disqualified BPLs that are not full-duplex capable with the first BPL. In some examples, a candidate BPL may be disqualified when the cross-link interference associated with the candidate BPL and the first BPL does not satisfy an interference threshold (e.g., the cross-link interference is greater than the interference threshold).

At 1160, the wireless device 1102 determines a subset of BPLs associated with the second node 1104b based on the first BPL. For example, the wireless device 1102 may use the transmitter-side beam or direction and/or the receiver-side beam or direction of the first BPL associated with the first node 1104a to determine a set of BPLs associated with the second node 1104b with transmitter-side beams or directions and/or receiver-side beams or directions that are full-duplex capable with the first BPL. In some examples, the wireless device 1102 may use the receiver-side beam or direction of the first BPL (e.g., the receive beam or direction of the wireless device 1102) to determine the set of BPLs. For example, the wireless device 1102 may determine the set of transmit directions 408*a*, 408*b*, 409*a*, 409*b* (or beams) associated with the second node 1104*b* that are full-duplex capable with the receive beam or direction of the first BPL. For example, the wireless device 1102 may determine that the receive beam or direction of the first BPL is associated with the first set of antennas 412*a* of the wireless device 1102 and determine the set of transmit beams or directions that are associated with the second set of antennas 412*b*.

In some examples, the wireless device 1102 may use the transmitter-side beam or direction of the first BPL (e.g., the transmit beam or direction of the first node 1104*a*) to determine the set of BPLs associated with the second node 1104*b*. For example, the wireless device 1102 may use the transmit beam or direction of the first BPL associated with the first node 1104*a* to determine the set of receive directions 408*a*, 408*b*, 409*a*, 409*b* (or beams) associated with the second node 1104*b* that are full-duplex capable with the transit beam or direction of the first BPL and/or may determine the set of transmit directions 408*a*, 408*b*, 409*a*, 409*b* (or beams) that are associated with the second node 1104*b* that are full-duplex capable with the receive beam or direction of the first BPL associated with the first node 1104*a*.

In some examples, the wireless device 1102 may use the relationship information 1150*a*, 1150*b* to determine the set of BPLs. For example, the relationship information 1150*a*, 1150*b* may include information regarding a set of transmit beams or directions that are full-duplex capable with a set of receive beams or directions. The wireless device 1102 may use the relationship information 1150*a*, 1150*b* to determine the set of BPLs associated with the second node 1104*b* by identifying the set of beams or directions that satisfy the relationship information 1150*a*, 1150*b* based on the first BPL.

In some examples, the relationship information 1150*a*, 1150*b* may include information regarding a set of BPLs associated with the second node 1104*b* that are full-duplex capable with the first BPL. For example, the nodes 1104*a*, 1104*b* may transmit the relationship information 1150*a*, 1150*b* based on the reports 1140*a*, 1140*b* including the first BPL associated with the first node 1104*a*. The wireless device 1102 may use the relationship information 1150*a*, 1150*b* to determine the set of BPLs associated with the second node 1104*b* accordingly.

Although the example of FIG. 11 illustrates the nodes 1104*a*, 1104*b* transmitting the relationship information 1150*a*, 1150*b* after receiving the reports 1140*a*, 1140*b*, in other examples, the first node 1104*a* may transmit the relationship information 1150*a* prior to receiving the report 1140*a* and/or the second node 1104*b* may transmit the relationship information 1150*b* prior to receiving the report 1140*b*. For example, the first node 1104*a* may configure and/or reconfigure the wireless device 1102 with relationship information 1150*a* (e.g., general relationship information) during/after establishing a connection with the wireless device 1102, and/or the second node 1104*b* may configure and/or reconfigure the wireless device 1102 with the relationship information 1150*b* during/after establishing a connection with the wireless device 1102.

At 1162, the wireless device 1102 performs measurements on the set of BPLs associated with the second node 1104*b*. For example, the wireless device 1102 may perform RSRP measurements, RSRQ measurements, SNR measurements, and/or SINR measurements for the BPLs of the set of BPLs (e.g., determined at 1160).

At 1170, the wireless device 1102 selects a second BPL based on the evaluations (e.g., at 1162). For example, the wireless device 1102 may select a pair of beams or directions including a receive beam or direction of the second node 1104*b* and a transmit beam or direction of the wireless device 1102 (e.g., one of the directions 408*a*, 408*b*, 409*a*, 409*b* (or beams)) with a quality measurement (e.g., a measured RSRP, a measured RSRQ, a measured SNR, and/or a measured SINR) that satisfies a quality threshold. The second BPL may include a set of one or more BPLs.

In some examples, the wireless device 1102 may transmit a report 1180*a* that is received by the first node 1104*a* and/or may transmit a report 1180*b* that is received by the second node 1104*b*. The reports 1180*a*, 1180*b* may include the first BPL (e.g., selected at 1130) and/or the second BPL (e.g., selected at 1170). In some examples, the reports 1180*a*, 1180*b* may include additional or alternate candidate BPLs that may be used for full-duplex communication. In some examples, the reports 1180*a*, 1180*b* may include additional or alternative disqualified BPLs that are not full-duplex capable with the first BPL.

In the illustrated example of FIG. 11, the wireless device 1102 performs full-duplex communication with the nodes 1104*a*, 1104*b*. For example, the wireless device 1102 may receive a first message 1190 from the first node 1104*a* using the first BPL. The wireless device 1102 may also transmit a second message 1192 that is received by the second node 1104*b* using the second BPL.

It may be appreciated that the receiving of the first message 1190 and the transmitting of the second message 1192 may be performed simultaneous (or nearly simultaneous) so that the wireless device 1102 is employing full-duplex communication.

In some examples, the wireless communication flow 1100 may facilitate full-duplex communication by a full-duplex capable base station or a full-duplex capable DU node in dual connectivity with a first node 1104*a* and a second node 1104*b* (e.g., the example communication system 600 of FIG. 6).

In some examples, one or more aspects of the wireless communication flow 1100 of FIG. 11 may facilitate full-duplex communication by a full-duplex capable base station or a full-duplex capable DU node in communication with a second and third device (e.g., the example communication system 600 of FIG. 6). For example, aspects of the wireless device 1102 may be implemented by the base station 102/180, the first wireless device 310 or the second wireless device 350, the first device 402, and/or the first device 602 of FIG. 6. Aspects of the nodes 1104*a*, 1104*b* may be implemented by the UE 104, the first wireless device 310 or the second wireless device 350, the second device 404, and/or the devices 604*a*, 604*b* of FIG. 6.

In some such examples, the wireless device 1102 (e.g., the first device 602 of FIG. 6 comprising a base station or a DU node of an IAB device) may select a first BPL associated with, for example, the first node 1104*a*. Aspects of selecting the first BPL associated with the first node 1104*a* may be similar to measuring an uplink reference signal (e.g., at 1120) and of selecting the first BPL (e.g., at 1130). It may be appreciated that the uplink reference signal may comprise a set of one or more uplink reference signals, such as SRS.

The wireless device 1102 may then select a second BPL associated with, for example, the second node 1104*b* based on the first BPL. Aspects of selecting the second BPL associated with the second node 1104*b* may be similar to determining a set of BPLs based on the first BPL (e.g., at 1160), performing measurements on the set of BPLs (e.g., at 1162), and selecting a second BPL (e.g., at 1170).

In some examples, the wireless device 1102 may provide report(s) to the first node 1104a and/or to the second node 1104b. The report(s) may include the first BPL associated with the first node 1104a and/or the second BPL associated with the second node 1104b, as described above in connection with the reports 1140a, 1140b. In some examples, the report(s) may include additional or alternate candidate BPLs that may be used for full-duplex communication. In some examples, the report(s) may include additional or alternative disqualified BPLs that are not full-duplex capable with the first BPL.

Figure 12:
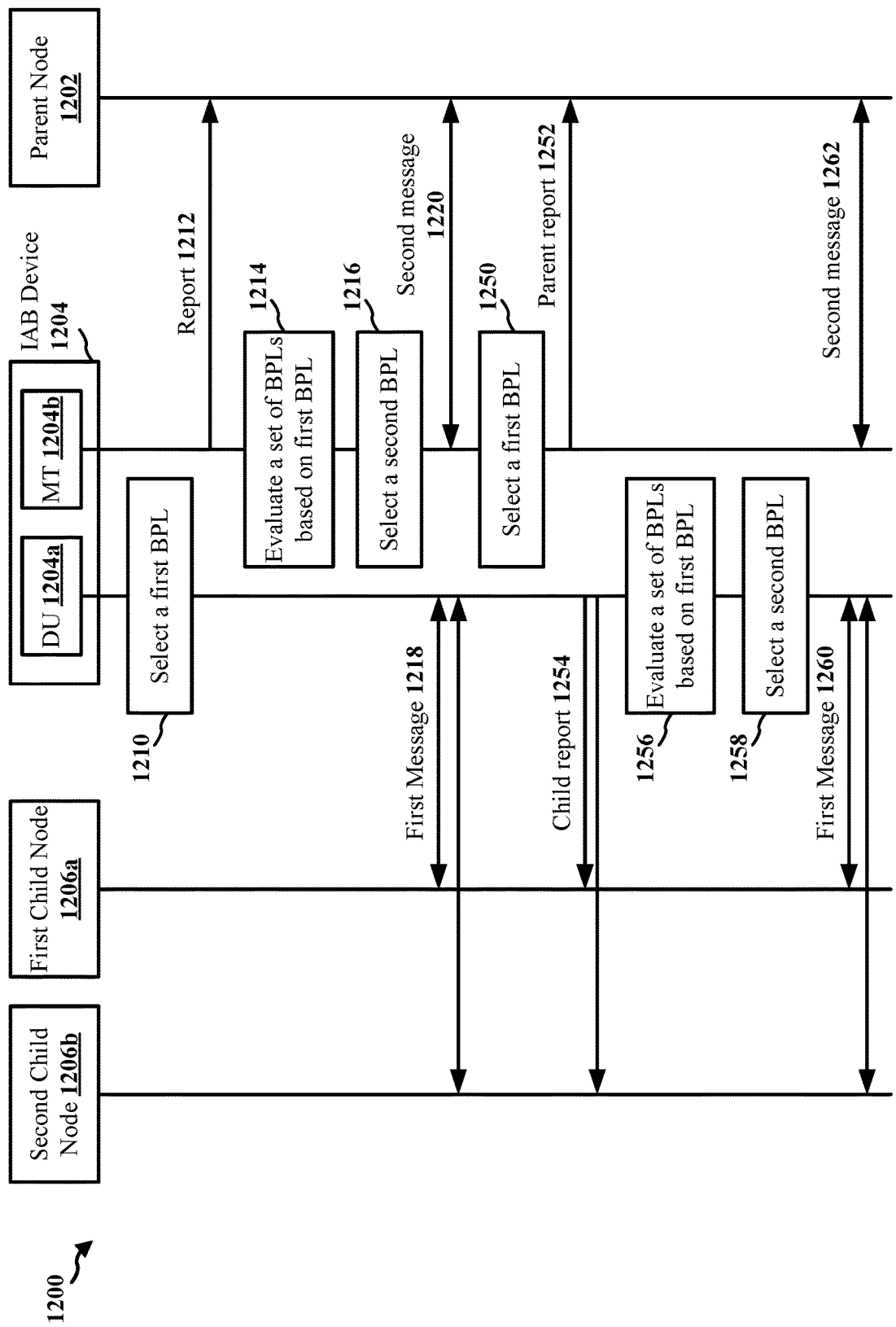
FIG. 12 is an example communication flow between an integrated access and backhaul (IAB) device, a parent node, and child nodes, in accordance with one or more techniques disclosed herein.

FIG. 12 illustrates an example wireless communication flow 1200 between a parent node 1202, an IAB device 1204, and child nodes 1206a, 1206b, as presented herein. In the illustrated example of FIG. 12, the wireless communication flow 1200 may facilitate full-duplex communication by a full-duplex capable IAB device in communication with a parent node and one or more child nodes (e.g., the example communication system 900 of FIG. 9). For example, as shown in FIG. 12, the IAB device 1204 includes a DU node 1204a in communication with a first child node 1206a and/or a second child node 1206b. The example IAB device 1204 also includes an MT node 1204b in communication with the parent node 1202. In some examples, the DU node 1204a may be associated with a first set of beams or directions (e.g., beams associated with a first set of antennas) and the MT node 1204b may be associated with a second set of beams or directions (e.g., beams associated with a second set of antennas).

One or more aspects of the parent node 1202 may be implemented by the base station 102/180 of FIG. 1, the first wireless device 310 or the second wireless device 350 of FIG. 3, the first device 402 of FIG. 4, and/or the parent node 902 of FIG. 9. One or more aspects of the IAB device 1204 may be implemented by the IAB device 904 of FIG. 9. One or more aspects of the child nodes 1206a, 1206b may be implemented by the UE 104 of FIG. 1, the first wireless device 310 or the second wireless device 350 of FIG. 3, the second device 404 of FIG. 4, and/or the child nodes 906a, 906b of FIGS. 9A and 9B.

In some examples, the DU node 1204a of the IAB device 1204 may select a first BPL and the MT node 1204b may prioritize the searching of a second BPL for full-duplex operation based on the first BPL.

At 1210, the IAB device 1204 selects a first BPL. For example, the DU node 1204a may select a first BPL associated with one or both of the child nodes 1206a, 1206b. Aspects of selecting the first BPL at 1210 of FIG. 12 may be similar to the measuring of a reference signal of FIG. 10 (e.g., at 1020) and/or of FIG. 11 (e.g., at 1120), and the selecting of the first BPL of FIG. 10 (e.g., at 1030) and/or of FIG. 11 (e.g., as 1130).

In the illustrated example, the IAB device 1204 may send a report 1212 that is received by the parent node 1202. The report 1212 may include the first BPL (e.g., selected at 1210). In some examples, the report 1212 may include information regarding candidate BPLs associated with the parent node 1202 that are full-duplex capable with the first BPL associated with the child nodes 1206a, 1206b. In such examples, the candidate BPLs associated with the parent node 1202 may not be evaluated yet (e.g., at 1214) and, thus, may not be capable of being used for communication (e.g., with the parent node 1202). In some examples, the report 1212 may include information regarding disqualified BPLs associated with the parent node 1202 (e.g., BPLs that are incapable of being used for full-duplex communication with the first BPL associated with the child nodes 1206a, 1206b).

At 1214, the IAB device 1204 evaluates a set of BPLs based on the first BPL. For example, the MT node 1204b may be configured to determine a set of BPLs associated with the parent node 1202 based on the first BPL associated with the child nodes 1206a, 1206b. The MT node 1204b may also be configured to perform measurements on the set of BPLs. Aspects of evaluating the set of BPLs (e.g., at 1214) of FIG. 12 may be similar to the determining of a set of BPLs of FIG. 10 (e.g., at 1060) and/or of FIG. 11 (e.g., at 1160), and the performing of measurements of FIG. 10 (e.g., at 1062) and/or of FIG. 11 (e.g., at 1162).

For example, the MT node 1204b may prioritize evaluating a set of BPLs associated with the parent node 1202 that are full-duplex capable with the first BPL associated with the child nodes 1206a, 1206b based on the receive beam or direction of the first BPL (e.g., when the DU node 1204a receives a message from the child nodes 1206a, 1206b, as shown in FIG. 9A) or based on the transmit beam or direction of the first BPL (e.g., when the DU node 1204a transmits a message to the child nodes 1206a, 1206b, as shown in FIG. 9B).

In some examples, the MT node 1204b may prioritize evaluating a set of BPLs associated with the parent node 1202 that are full-duplex capable with the first BPL associated with the child nodes 1206a, 1206b based on relationship information associated with reference signals associated with the parent node 1202. For example, the parent node 1202 may configure and/or reconfigure the IAB device 1204 with relationship information during/after establishing a connection with the IAB device 1204. In some examples, the parent node 1202 may provide relationship information based on the report 1212. Aspects of the relationship information may be similar to the relationship information 1050 of FIG. 10 and/or the relationship information 1150a, 1150b of FIG. 11.

At 1216, the IAB device 1204 selects a BPL. For example, the MT node 1204b may select a second BPL that is associated with the parent node 1202. Aspects of the selecting of the second BPL at 1216 of FIG. 12 may be similar to the selecting of the second BPL of FIG. 10 (e.g., at 1070) and/or of FIG. 11 (e.g., at 1170).

In the illustrated example of FIG. 12, the IAB device 1204 performs full-duplex communication with the parent node 1202 and the child nodes 1206a, 1206b. For example, the DU node 1204a may transmit a first message 1218 to the first child node 1206a and/or to the second child node 1206b using the first BPL. The MT node 1204b may also receive a second message 1220 from the parent node 1202 using the second BPL.

It may be appreciated that the transmitting of the first message 1218 and the receiving of the second message 1220 may be performed simultaneously (or nearly simultaneous) so that the IAB device 1204 is employing full-duplex communication.

It may be appreciated that in some examples, the IAB device 1204 may transmit an additional or alternative report, that is received by the parent node 1202 and/or the child nodes 1206a, 1206b, after selecting the second BPL (e.g., at 1216). The report(s) may include the first BPL (e.g., selected at 1210) and/or the second BPL (e.g., selected at 1216). In some examples, the report(s) may include additional or alternate candidate BPLs that may be used for full-duplex communication. In some examples, the report(s) may include additional or alternative disqualified BPLs that are not full-duplex capable with the first BPL.

In some examples, the MT node 1204b of the IAB device 1204 may select a first BPL and the DU node 1204a may prioritize the searching of a second BPL for full-duplex operation based on the first BPL.

At 1250, the IAB device 1204 selects a first BPL. For example, the MT node 1204b may select a first BPL associated with the parent node 1202. Aspects of selecting the first BPL at 1250 of FIG. 12 may be similar to the measuring of a reference signal of FIG. 10 (e.g., at 1020) and/or of FIG. 11 (e.g., at 1120), and the selecting of the first BPL of FIG. 10 (e.g., at 1030) and/or of FIG. 11 (e.g., as 1130).

In the illustrated example, the IAB device 1204 may send a report that is received by the parent node 1202 and/or the child nodes 1206a, 1206b. For example, the MT node 1204b may transmit a parent report 1252 that is received by the parent node 1202. The DU node 1204a may transmit a child report 1254 that is received by the child nodes 1206a, 1206b. The reports 1252, 1254 may include the first BPL (e.g., selected at 1250). In some examples, the reports 1252, 1254 may include information regarding candidate BPLs associated with the child nodes 1206a, 1206b that are full-duplex capable with the first BPL associated with the parent node 1202. In such examples, the candidate BPLs associated with the child nodes 1206a, 1206b may not be evaluated yet (e.g., at 1256) and, thus, may not be capable of being used for communication (e.g., with the child nodes 1206a, 1206b). In some examples, the reports 1252, 1254 may include information regarding disqualified BPLs associated with the child nodes 1206a, 1206b (e.g., BPLs that are incapable of being used for full-duplex communication with the first BPL associated with the parent node 1202).

At 1256, the IAB device 1204 evaluates a set of BPLs based on the first BPL. For example, the DU node 1204a may be configured to determine a set of BPLs associated with the child nodes 1206a, 1206b based on the first BPL associated with the parent node 1202. The DU node 1204a may also be configured to perform measurements on the set of BPLs. Aspects of evaluating the set of BPLs (e.g., at 1256) of FIG. 12 may be similar to the determining of a subset of BPLs of FIG. 10 (e.g., at 1060) and/or of FIG. 11 (e.g., at 1160), and the performing of measurements of FIG. 10 (e.g., at 1062) and/or of FIG. 11 (e.g., at 1162).

For example, the DU node 1204a may prioritize evaluating a set of BPLs, associated with the child nodes 1206a, 1206b, that are full-duplex capable with the first BPL associated with the parent node 1202 based on the receive beam or direction of the first BPL (e.g., when the MT node 1204b receives a message from the parent node 1202, as shown in FIG. 9B) or based on the transmit beam or direction of the first BPL (e.g., when the MT node 1204b transmits a message to the parent node 1202, as shown in FIG. 9A).

In some examples, the DU node 1204a may prioritize evaluating a set of BPLs, associated with the child nodes 1206a, 1206b, that are full-duplex capable with the first BPL associated with the parent node 1202 based on relationship information associated with reference signals associated with the parent node 1202. For example, the parent node 1202 may configure and/or reconfigure the IAB device 1204 with relationship information during/after establishing a connection with the IAB device 1204. In some examples, the parent node 1202 may provide relationship information based on the parent report 1252. Aspects of the relationship information may be similar to the relationship information 1050 of FIG. 10 and/or the relationship information 1150a, 1150b of FIG. 11.

At 1258, the IAB node 1204 selects a BPL. For example, the DU node 1204a may select a second BPL that is associated with the child nodes 1206a, 1206b. Aspects of the selecting of the second BPL at 1258 of FIG. 12 may be similar to the selecting of the second BPL of FIG. 10 (e.g., at 1070) and/or of FIG. 11 (e.g., at 1170).

In the illustrated example of FIG. 12, the IAB device 1204 performs full-duplex communication with the parent node 1202 and the child nodes 1206a, 1206b. For example, the DU node 1204a may transmit a first message 1260 to the first child node 1206a and/or to the second child node 1206b using the second BPL. The MT node 1204b may also receive a second message 1262 from the parent node 1202 using the first BPL.

It may be appreciated that the transmitting of the first message 1260 and the receiving of the second message 1262 may be performed simultaneously (or nearly simultaneous) so that the IAB device 1204 is employing full-duplex communication.

It may be appreciated that in some examples, the IAB device 1204 may transmit a report, that is received by the parent node 1202 and/or the child nodes 1206a, 1206b, after selecting the second BPL (e.g., at 1258). The report(s) may include the first BPL (e.g., selected at 1250) and/or the second BPL (e.g., selected at 1258). In some examples, the report(s) may include additional or alternate candidate BPLs that may be used for full-duplex communication. In some examples, the report(s) may include additional or alternative disqualified BPLs that are not full-duplex capable with the first BPL.

Figure 13:
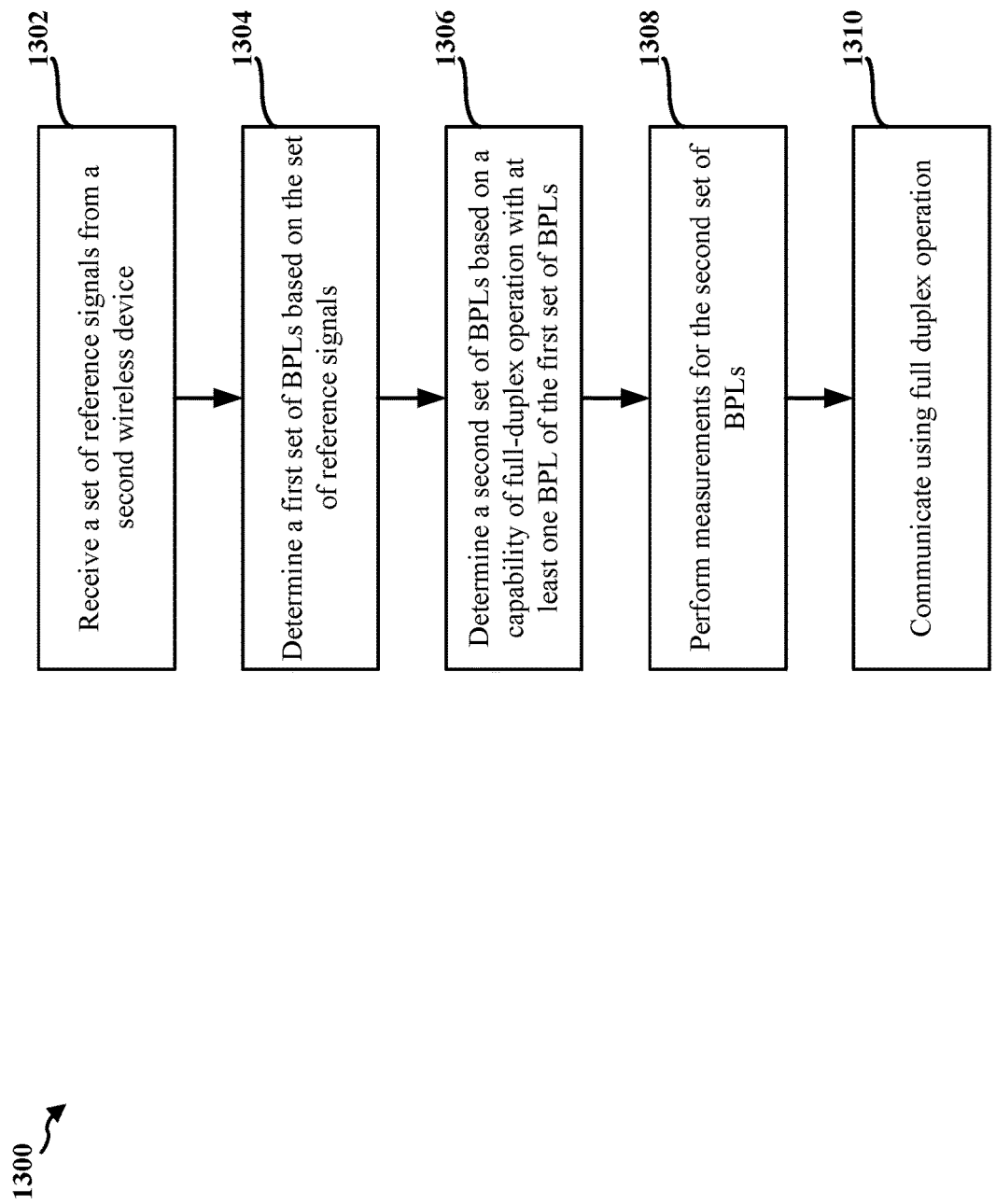
FIG. 13 is a flowchart of a method of wireless communication at a wireless device, in accordance with the teachings disclosed herein.

FIG. 13 is a flowchart 1300 of a method of wireless communication. The method may be performed by a first wireless device (e.g., an apparatus 1502 of FIG. 15) in communication with a second wireless device. The first wireless device may include a UE or a mobile termination node and the second wireless device may include a first TRP and a second TRP, base station, or a distributed unit node (as described above in connection with FIG. 5). The method may facilitate improving cell coverage and/or increased throughput by enabling full-duplex communication at a wireless device.

The first wireless device and the second wireless device may each be capable of full-duplex operation. In some examples, the first wireless device may include a base station or a distributed unit node, the second wireless device may include a UE or a mobile termination node, and a third wireless device may comprise a UE or a mobile termination node (as described above in connection with FIG. 6). The first wireless device may be capable of full-duplex operation. The first set of BPLs may be associated with the second wireless device and the second set of BPLs may be associated with the third wireless device different than the second wireless device. In some examples, the first wireless device may include a UE or a mobile termination node and the second wireless device may include a base station or a distributed unit node (as described above in connection with FIGS. 7A and 7B). The first wireless device and the second wireless device may each be capable of full-duplex operation. In some examples, the first wireless device may include a UE or a mobile termination node, the second wireless device may include a first base station or a first distributed unit node, and a third wireless device may include a second base station or a third distributed unit node (as described above in connection with FIG. 8). The first wireless device may be capable of full-duplex operation. The first set of BPLs may be associated with the second wireless device and the second set of BPLs may be associated with a third wireless device different than the second wireless device. In some examples, the first wireless device may include an IAB device including a mobile termination node associated with a first set of beams and a distributed unit node associated with a second set of beams (as described above in connection with FIGS. 9A and 9B).

At 1302, the first wireless device receives a set of reference signals from a second wireless device, as described above in connection with 1010 of FIGS. 10 and/or 1110 of FIG. 11. The receiving of the reference signals, at 1302, may be performed by a reference signal component 1542 of the apparatus 1502 of FIG. 15. The set of reference signals may include any suitable combination of one or more CSI-RS, SSB, PT-RS, or SRS.

At 1304, the first wireless device determines a first set of beam-pair links (BPLs) based on the set of reference signals, as described above in connection with 1030 of FIG. 10, 1130 of FIG. 11, 1210 of FIG. 12, and/or 1250 of FIG. 12. The determining of the first set of BPLs, at 1304 may be performed by a determination component 1544 of the apparatus 1502 of FIG. 15.

As part of determining the first set of BPLs, the first wireless device may evaluate a plurality of receiver-side and/or transmitter side beams based on the set of reference signals, and may select one or more BPLs based on the receiver-side and/or transmitter-side beams that satisfy a quality threshold based on the evaluating.

At 1306, the first wireless device determines a second set of BPLs based on a capability of full-duplex operation with at least one BPL of the first set of BPLs, as described above in connection with 1060 of FIG. 10, 1160 of FIG. 11, 1214 of FIGS. 12, and/or 1256 of FIG. 12. The determining of the second set of BPLs, at 1306, may be performed by the determination component 1544 of the apparatus 1502 of FIG. 15.

At 1308, the first wireless device performs measurements for the second set of BPLs, as described above in connection with 1062 of FIG. 10, 1162 of FIG. 11, 1214 of FIG. 12, and/or 1256 of FIG. 12. The performing of the measurements, at 1308, may be performed by a measurement component 1546 of the apparatus 1502 of FIG. 15.

As part of determining the second set of BPLs (e.g., at 1306) and performing measurements for the second set of BPLs (e.g., at 1308), in some examples, the first wireless device selects a first subset of a plurality of receiver-side beams based on the at least one BPL of the first set of BPLs, where each receiver-side beam of the first subset of receiver-side beams is capable of full-duplex operation with a receiver-side beam of the at least one BPL of the first set of BPLs, evaluates the first subset of receiver-side beams based on the set of reference signals, and selects one or more BPLs based on the first subset of receiver-side beams that satisfy a quality threshold based on the evaluating.

In some examples, a second subset of the plurality of receiver-side beams may comprise the receiver-side beam of the at least one BPL of the first set of BPLs. In some examples, the first subset of receiver-side beams may be associated with a first antenna array of the first wireless device and the second subset of receiver-side beams may be associated with a second antenna array of the first wireless device, and where the first antenna array is different than the second antenna array.

At 1310, the first wireless device communicates using full-duplex operation by transmitting or receiving via a BPL of the first set of BPLs while also performing the other of transmitting or receiving via a BPL of the second set of BPLs, as described above in connection with the messages 1090, 1092 of FIG. 10, the messages 1190, 1192 of FIG. 11, and/or the messages 1218, 1220, 1260, 1262 of FIG. 12. The communicating using full-duplex operation, at 1310, may be performed by a full-duplex communication component 1554 of the apparatus 1502 of FIG. 15. In some examples, a reception component 1530 of the apparatus 1502 of FIG. 15 may facilitate receiving a message while transmission component 1534 of the apparatus 1502 of FIG. 15 may facilitate transmitting a message.

Figure 14:
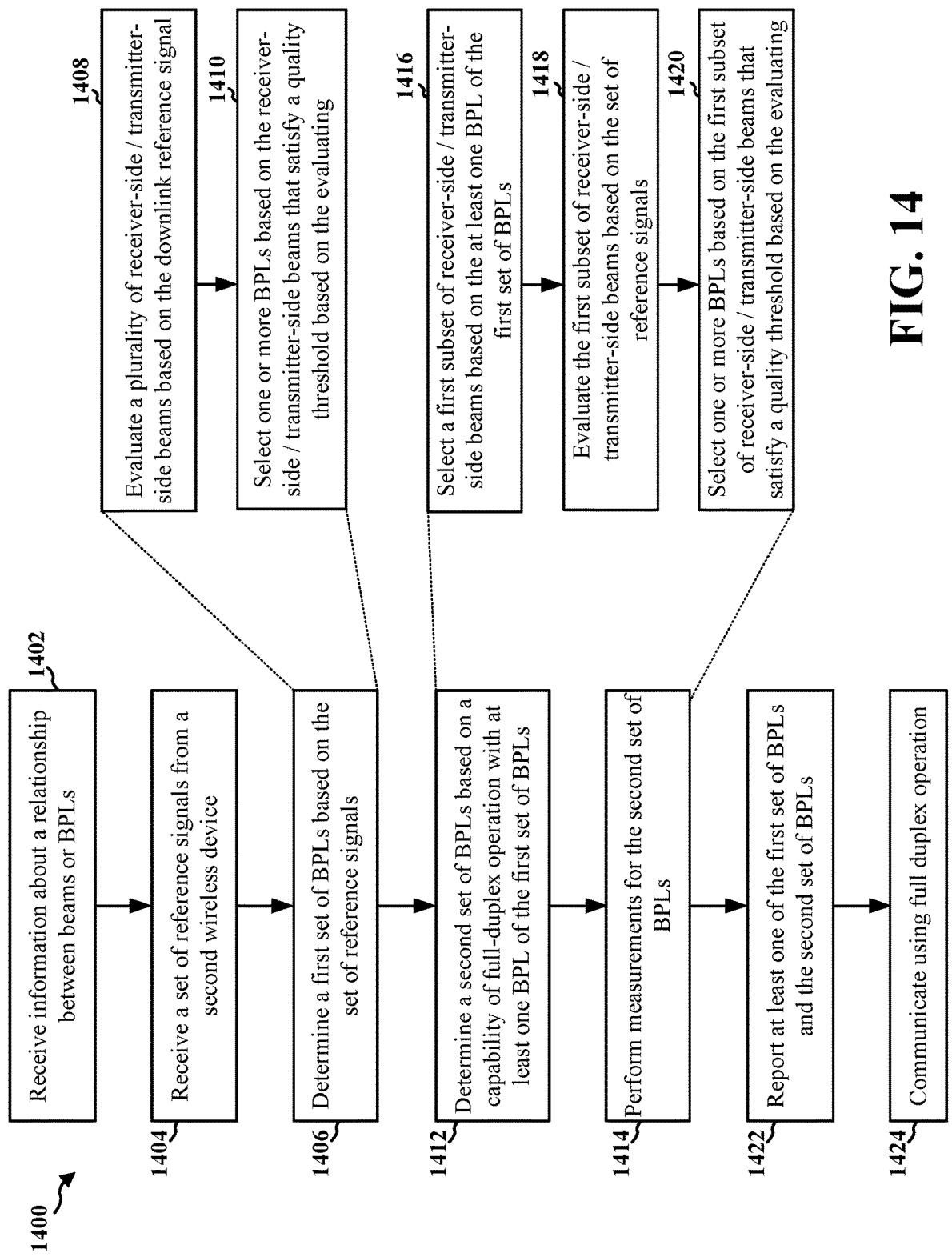
FIG. 14 is a flowchart of a method of wireless communication at a wireless device, in accordance with the teachings disclosed herein.

FIG. 14 is a flowchart 1400 of a method of wireless communication. The method may be performed by a first wireless device (e.g., an apparatus 1502 of FIG. 15) in communication with a second wireless device. The first wireless device may include a UE or a mobile termination node and the second wireless device may include a first TRP and a second TRP, base station, or a distributed unit node (as described above in connection with FIG. 5). The method may facilitate improving cell coverage and/or increased throughput by enabling full-duplex communication at a wireless device.

The first wireless device and the second wireless device may each be capable of full-duplex operation. In some examples, the first wireless device may include a base station or a distributed unit node, the second wireless device may include a UE or a mobile termination node, and a third wireless device may comprise a UE or a mobile termination node (as described above in connection with FIG. 6). The first wireless device may be capable of full-duplex operation. The first set of BPLs may be associated with the second wireless device and the second set of BPLs may be associated with the third wireless device different than the second wireless device. In some examples, the first wireless device may include a UE or a mobile termination node and the second wireless device may include a base station or a distributed unit node (as described above in connection with FIGS. 7A and 7B). The first wireless device and the second wireless device may each be capable of full-duplex operation. In some examples, the first wireless device may include a UE or a mobile termination node, the second wireless device may include a first base station or a first distributed unit node, and a third wireless device may include a second base station or a third distributed unit node (as described above in connection with FIG. 8). The first wireless device may be capable of full-duplex operation. The first set of BPLs may be associated with the second wireless device and the second set of BPLs may be associated with a third wireless device different than the second wireless device. In some examples, the first wireless device may include an IAB device including a mobile termination node associated with a first set of beams and a distributed unit node associated with a second set of beams (as described above in connection with FIGS. 9A and 9B).

At 1404, the first wireless device receives a set of reference signals from a second wireless device, as described above in connection with 1010 of FIGS. 10 and/or 1110 of FIG. 11. The receiving of the reference signals, at 1404, may be performed by a reference signal component 1542 of the apparatus 1502 of FIG. 15. The set of reference signals may include any suitable combination of one or more CSI-RS, SSB, PT-RS, or SRS.

At 1406, the first wireless device determines a first set of beam-pair links (BPLs) based on the set of reference signals, as described above in connection with 1030 of FIG. 10, 1130 of FIG. 11, 1210 of FIG. 12, and/or 1250 of FIG. 12. The determining of the first set of BPLs, at 1406 may be performed by a determination component 1544 of the apparatus 1502 of FIG. 15.

As part of determining the first set of BPLs, the first wireless device may evaluate a plurality of receiver-side and/or transmitter side beams based on the set of reference signals, as illustrated at 1408 (e.g., as described above in connection with 1020 of FIGS. 10 and/or 1120 of FIG. 12), and select one or more BPLs based on the receiver-side and/or transmitter-side beams that satisfy a quality threshold based on the evaluating, as illustrated at 1410 (e.g., as described above in connection with 1030 of FIG. 10, 1130 of FIG. 11, 1210 of FIG. 12, and/or 1250 of FIG. 12). The evaluating of the beams, at 1408, may be performed by an evaluation component 1550 of the apparatus 1502 of FIG. 15. The selecting of the one or more BPLs, at 1410, may be performed by a selection component 1552 of the apparatus 1502 of FIG. 15.

At 1412, the first wireless device determines a second set of BPLs based on a capability of full-duplex operation with at least one BPL of the first set of BPLs, as described above in connection with 1060 of FIG. 10, 1160 of FIG. 11, 1214 of FIG. 12, and/or 1256 of FIG. 12. The determining of the second set of BPLs, at 1412, may be performed by the determination component 1544 of the apparatus 1502 of FIG. 15.

At 1414, the first wireless device performs measurements for the second set of BPLs, as described above in connection with 1062 of FIG. 10, 1162 of FIG. 11, 1214 of FIGS. 12, and/or 1256 of FIG. 12. The performing of the measurements, at 1414, may be performed by a measurement component 1546 of the apparatus 1502 of FIG. 15.

As part of determining the second set of BPLs (e.g., at 1412) and performing measurements for the second set of BPLs (e.g., at 1414), in some examples, the first wireless device selects a first subset of a plurality of receiver-side beams based on the at least one BPL of the first set of BPLs, where each receiver-side beam of the first subset of receiver-side beams is capable of full-duplex operation with a receiver-side beam of the at least one BPL of the first set of BPLs (e.g., at 1416), evaluates the first subset of receiver-side beams based on the set of reference signals (e.g., at 1418), and selects one or more BPLs based on the first subset of receiver-side beams that satisfy a quality threshold based on the evaluating (e.g., at 1420).

In some examples, a second subset of the plurality of receiver-side beams may comprise the receiver-side beam of the at least one BPL of the first set of BPLs. In some examples, the first subset of receiver-side beams may be associated with a first antenna array of the first wireless device and the second subset of receiver-side beams may be associated with a second antenna array of the first wireless device, and where the first antenna array is different than the second antenna array.

As illustrated at 1402, the first wireless device may receive information regarding a relationship between the at least one BPL of the first set of BPLs and beams of the second subset of receiver-side beams, as described above in connection with the relationship information 1050 of FIG. 10 and/or the relationship information 1150*a*, 1150*b* of FIG. 11. The receiving of the information, at 1402, may be performed by a relationship component 1540 of the apparatus 1502 of FIG. 15. The first wireless device may select the first subset of receiver-side beams based on the received information (e.g., at 1416).

In some examples, as part of determining the second set of BPLs (e.g., at 1412) and performing measurements for the second set of BPLs (e.g., at 1414), the first wireless device selects a first subset of a plurality of transmitter-side beams based on the at least one BPL of the first set of BPLs, where each transmitter-side beam of the first subset of transmitter-side beams is capable of full-duplex operation with the transmitter-side beam of at least one BPL of the first set of BPLs (e.g., at 1416), evaluates the first subset of transmitter-side beams based on the set of reference signals (e.g., at 1418), and selects one or more BPLs based on the first subset of transmitter-side beams that satisfy a quality threshold based on the evaluating (e.g., at 1420).

In some examples, the set of reference signals are associated with at least two transmitter-side beams. In some examples, a second subset of the plurality of transmitter-side beams may comprise the transmitter-side beam of the at least one BPL of the first set of BPLs. In some examples, the first subset of transmitter-side beams may be associated with a first antenna array or a first TRP of the second wireless device and the second subset of transmitter-side beams may be associated with a second antenna array or a second TRP of the second wireless device, the first antenna array or the first TRP being different than the second antenna array or the second TRP.

In some such examples, the first wireless device may receive information regarding a relationship between beams of the first subset of transmitter-side beams and beams of the second subset of transmitter-side beams (e.g., at 1402). Alternatively, the first wireless device may receive information regarding a relationship between the at least one BPL of the first set of BPLs and beams of the second subset of transmitter-side beams. The first wireless device may select the first subset of transmitter-side beams based on the received information (e.g., at 1416).

The selecting of the first subset of receiver-side/transmitter-side beams based on the at least one BPL of the first set of BPLs, at 1416, may be performed by the selection component 1552 of the apparatus 1502 of FIG. 15.

The evaluating of the first subset of receiver-side/transmitter-side beams based on the set of reference signals, at 1418, may be performed by the evaluation component 1550 of the apparatus 1502 of FIG. 15

The selecting of one or more BPLs based on the first subset of receiver-side/transmitter-side beams that satisfy a quality threshold based on the evaluating, at 1420, may be performed by the selection component 1552 of the apparatus 1502 of FIG. 15.

As illustrated at 1422, the first wireless device may report at least one of the first sets of BPLs and the second set of BPLs to the second wireless device or to a control node, as described above in connection with the reports 1040, 1080 of FIG. 10, the reports 1140*a*, 1140*b*, 1180*a*, 1180*b* of FIG. 11, and/or the reports 1212, 1252, 1254 of FIG. 12. The reporting, at 1420, may be performed by a report component 1548 of the apparatus 1502 of FIG. 15.

In some examples, the first wireless device may comprise a UE or a mobile termination node, the second wireless device may comprise a first base station or distributed unit node, and a third wireless device may comprise a second base station or distributed unit node. The first wireless device may be capable of full-duplex operation. The first wireless device may receive, at 1402, relationship information between beams of a first subset of transmitter-side beams of the second wireless device and beams of a second subset of transmitter-side beams of the third wireless device. The first set of BPLs may be associated with a subset of the first subset of transmitter-side beams and the second set of BPLs may be associated with a subset of the second subset of transmitter-side beams. At 1412, the first wireless device may determine the second set of BPLs based on the received information. In some examples, the beams of the first subset of transmitter-side beams and the beams of the second subset of transmitter-side beams may be associated with cross-link interference that satisfies an interference threshold. The first wireless device may report a third set of BPLs to the third wireless device based on the first set of BPLs (e.g., at 1422). In some examples, the third set of BPLs may include at least one of BPLs that are incapable of full-duplex operation with the at least one BPL of the first set of BPLs, or BPLs that fail to satisfy a quality threshold. In some examples, the third set of BPLs may comprise BPLs that are capable of full-duplex operation with the at least one BPL of the first set of BPLs and that satisfy a quality threshold.

In some examples, the first wireless device includes an IAB device including a mobile termination node associated with a first set of receiver-side beams and a distributed unit node associated with a second set of receiver-side beams. The mobile termination node may be in communication with a parent node and the distributed unit node may be in communication with at least one child node, and where the IAB device may be capable of full-duplex operation with the parent node and the child node.

In some examples, the first set of BPLs may be associated with the parent node and the second set of BPLs may be associated with the child node. The second set of BPLs may be selected (e.g., at 1412) based on a subset of the second set of receiver-side beams, and each of the receiver-side beams of the subset may be capable of full-duplex operation with receiver-side beams of the first set of BPLs. In some examples, the second set of BPLs may be associated with a cross-link interference with the first set of BPLs that satisfies an interference threshold. In some examples, the first wireless device may report (e.g., at 1422) a third set of BPLs to the second wireless device or to a control node based on the first set of BPLs. In some examples, the third set of BPLs may comprise BPLs that are incapable of full-duplex operation with the at least one BPL of the first set of BPLs. In some examples, the third set of BPLs may comprise BPLs that are capable of full-duplex operation with the at least one BPL of the first set of BPLs and that satisfy a quality threshold.

In some examples, the first set of BPLs may be associated with the child node and the second set of BPLs may be associated with the parent node. In some examples, the second set of BPLs may be selected (e.g., at 1412) from a subset of the second set of receiver-side beams, and where each of the receiver-side beams of the subset are capable of full-duplex operation with receiver-side beams of the first set of BPLs. In some examples, the second set of BPLs may be associated with a cross-link interference with the first set of BPLs that satisfies an interference threshold. The first wireless device may report (e.g., at 1422) a third set of BPLs to the second wireless device or to a control node based on the first set of BPLs. The third set of BPLs may comprise BPLs that are incapable of full-duplex operation with the at least one BPL of the first set of BPLs. The third set of BPLs may comprise BPLs that are capable of full-duplex operation with the at least one BPL of the first set of BPLs and that satisfy a quality threshold.

At 1424, the first wireless device communicates using full-duplex operation by transmitting or receiving via a BPL of the first set of BPLs while also performing the other of transmitting or receiving via a BPL of the second set of BPLs, as described above in connection with the messages 1090, 1092 of FIG. 10, the messages 1190, 1192 of FIG. 11, and/or the messages 1218, 1220, 1260, 1262 of FIG. 12. The communicating using full-duplex operation, at 1424, may be performed by a full-duplex communication component 1554 of the apparatus 1502 of FIG. 15. In some examples, a reception component 1530 of the apparatus 1502 of FIG. 15 may facilitate receiving a message while transmission component 1534 of the apparatus 1502 of FIG. 15 may facilitate transmitting a message.

FIG. 15 is a diagram 1500 illustrating an example of a hardware implementation for an apparatus 1502. The apparatus 1502 may be a UE, a base station, an IAB node, or other first wireless device. The apparatus 1502 includes a baseband unit 1504. The baseband unit 1504 may communicate through a cellular RF transceiver with the UE 104, the IAB node 103, or the base station 102/180. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of a UE, IAB node, etc. and may include the memory 376/360 and/or at least one of the TX processor 316 or 368, the RX processor 356 or 370, and the controller/processor 359 or 375.

The communication manager 1532 includes a relationship component 1540 that is configured to receive information about a relationship between beams or BPLs, for example, as described in connection with 1402 of FIG. 14.

The communication manager 1532 also includes a reference signal component 1542 that is configured to receive a set of reference signals from a second wireless device, for example, as described in connection with 1302 of FIGS. 13 and/or 1404 of FIG. 14.

The communication manager 1532 also includes a determination component 1544 that is configured to determine a first set of BPLs based on the set of reference signals, for example, as described in connection with 1304 of FIGS. 13 and/or 1406 of FIG. 14. The example determination component 1544 may also be configured to determine a second set of BPLs based on a capability of full-duplex operation with at least one BPL of the first set of BPLs, for example, as described in connection with 1306 of FIGS. 13 and/or 1412 of FIG. 14.

The communication manager 1532 also includes a measurement component 1546 that is configured to perform measurements for the second set of BPLs, for example, as described in connection with 1308 of FIGS. 13 and/or 1414 of FIG. 14.

The communication manager 1532 also includes a report component 1548 that is configured to report the first set of BPLs and the second set of BPLs to the second wireless device, for example, as described in connection with 1422 of FIG. 14.

The communication manager 1532 also includes evaluation component 1550 that is configured to evaluate a plurality of receiver-side/transmitter-side beams based on the downlink reference signal, for example, as described in connection with 1408 of FIG. 14. The example evaluation component 1550 may also be configured to evaluate the first subset of receiver-side/transmitter-side beams based on the set of reference signals, for example, as described in connection with 1418 of FIG. 14.

The communication manager 1532 also includes a selection component 1552 that is configured to select one or more BPLs based on the receiver-side/transmitter-side beams that satisfy a quality threshold based on the evaluating, for example, as described in connection with 1410 of FIG. 14. The example selection component 1552 may also be configured to select a first subset of receiver-side/transmitter-side beams based on the at least one BPL of the first set of BPLs, for example, as described in connection with 1416 of FIG. 14. The example selection component 1552 may also be configured to select one or more BPLs based on the first subset of receiver-side/transmitter-side beams that satisfy a quality threshold based on the evaluating, for example, as described in connection with 1420 of FIG. 14.

The communication manager 1532 also includes a full-duplex communication component 1554 that is configured to communicate using full-duplex operation, for example, as described in connection with 1310 of FIGS. 13 and/or 1424 of FIG. 14.

The apparatus may include additional components that perform each of the blocks of the algorithm in the flowcharts of FIGS. 13 and/or 14. As such, each block in the flowcharts of FIGS. 13 and/or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for receiving a set of reference signals from a second wireless device. The example apparatus 1502 also includes means for determining a first set of BPLs based on the set of reference signals. The example apparatus 1502 also includes means for determining a second set of BPLs based on a capability of full-duplex operation with at least one BPL of the first set of BPLs. The example apparatus 1502 also includes means for performing measurements for the second set of BPLs. The example apparatus 1502 also includes means for communicating using full-duplex operation by transmitting or receiving via a BPL of the first set of BPLs while also performing the other of transmitting or receiving via a BPL of the second set of BPLs.

In another configuration, the example apparatus 1502 also includes means for evaluating a plurality of beams based on the set of reference signals. The example apparatus 1502 also includes means for selecting one or more BPLs based on the beams that satisfy a quality threshold based on the evaluating.

In another configuration, the example apparatus 1502 also includes means for selecting a first subset of a plurality of receiver-side beams based on the at least one BPL of the first set of BPLs, where each receiver-side beam of the first subset of receiver-side beams is capable of full-duplex operation with a receiver-side beam of the at least one BPL of the first set of BPLs. The example apparatus 1502 also includes means for evaluating the first subset of receiver-side beams based on the set of reference signals. The example apparatus 1502 also includes means for selecting one or more BPLs based on the first subset of receiver-side beams that satisfy a quality threshold based on the evaluating.

In another configuration, the example apparatus 1502 also includes means for receiving information regarding a relationship between the at least one BPL of the first set of BPLs and beams of the second subset of receiver-side beams, and where selecting the first subset of receiver-side beams is based on the received information.

In another configuration, the example apparatus 1502 also includes means for selecting a first subset of a plurality of transmitter-side beams based on the at least one BPL of the first set of BPLs, where each transmitter-side beam of the first subset of transmitter-side beams is capable of full-duplex operation with the transmitter-side beam of at least one BPL of the first set of BPLs. The example apparatus 1502 also includes means for evaluating the first subset of transmitter-side beams based on the set of reference signals. The example apparatus 1502 also includes means for selecting one or more BPLs based on the first subset of transmitter-side beams that satisfy a quality threshold based on the evaluating.

In another configuration, the example apparatus 1502 also includes means for receiving information regarding a relationship between beams of the first subset of transmitter-side beams and beams of the second subset of transmitter-side beams, and where selecting the first subset of transmitter-side beams is based on the received information.

In another configuration, the example apparatus 1502 also includes means for receiving information regarding a relationship between the at least one BPL of the first set of BPLs and beams of the second subset of transmitter-side beams, and where selecting the first subset of transmitter-side beams is based on the received information.

In another configuration, the example apparatus 1502 also includes means for reporting at least one of the first set of BPLs and the second set of BPLs to the second wireless device or to a control node.

In another configuration, the example apparatus 1502 also includes means for receiving relationship information between beams of a first subset of transmitter-side beams of the second wireless device and beams of a second subset of transmitter-side beams of the third wireless device, where the first set of BPLs are associated with a subset of the first subset of transmitter-side beams and the second set of BPLs are associated with a subset of the second subset of transmitter-side beams, and where determining the second set of BPLs is based on the received information.

The means may be one or more of the components of the apparatus 1502 configured to perform the functions recited by the means. As described supra, the apparatus 1502 may include the TX processor 316/368, the RX processor 356/370, and the controller/processor 359/375. As such, in one configuration, the means may be the TX processor 316/368, the RX processor 356/370, and the controller/processor 359/375 configured to perform the functions recited by the means.

The baseband unit 1504 may be a component of a UE, JAB node, etc. and may include the memory 376/360 and/or at least one of the TX processor 316 or 368, the RX processor 356 or 370, and the controller/processor 359 or 375.

To facilitate full-duplex communication, example techniques disclosed herein enable the wireless device to reduce the quantity of beams that may be processed for determining full-duplex communication. For example, disclosed techniques enable identifying a first beam candidate and then prioritizing the searching of a subset of beam candidates for a beam candidate that is capable of full-duplex communication with respect to the first beam candidate (e.g., a second beam candidate of the subset of beam candidates that may be used for communicating while also communicating using the first beam candidate).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first wireless device including at least one processor coupled to a memory and configured to receive a set of reference signals from a second wireless device; determine a first set of BPLs based on the set of reference signals; determine a second set of BPLs based on a capability of full-duplex operation with at least one BPL of the first set of BPLs; perform measurements for the second set of BPLs; and communicate using full-duplex operation by transmitting or receiving via a BPL of the first set of BPLs while also performing the other of transmitting or receiving via a BPL of the second set of BPLs.

Aspect 2 is the apparatus of aspect 1, further including that the set of reference signals comprises at least one of CSI-RS, SSB, PT-RS, or SRS.

Aspect 3 is the apparatus of any of aspects 1 and 2, further including that to determine the first set of BPLs, the at least one processor and the memory are configured to: evaluate a plurality of beams based on the set of reference signals; and select one or more BPLs based on the beams that satisfy a quality threshold based on the evaluating.

Aspect 4 is the apparatus of any of aspects 1 to 3, further including that to determine the second set of BPLs, the at least one processor and the memory are configured to: select a first subset of a plurality of receiver-side beams based on the at least one BPL of the first set of BPLs, where each receiver-side beam of the first subset of receiver-side beams is capable of full-duplex operation with a receiver-side beam of the at least one BPL of the first set of BPLs; evaluate the first subset of receiver-side beams based on the set of reference signals; and select one or more BPLs based on the first subset of receiver-side beams that satisfy a quality threshold based on the evaluating.

Aspect 5 is the apparatus of any of aspects 1 to 4, further including that a second subset of the plurality of receiver-side beams comprises the receiver-side beam of the at least one BPL of the first set of BPLs.

Aspect 6 is the apparatus of any of aspects 1 to 5, further including that the first subset of receiver-side beams is associated with a first antenna array of the first wireless device and the second subset of receiver-side beams is associated with a second antenna array of the first wireless device, where the first antenna array is different than the second antenna array.

Aspect 7 is the apparatus of any of aspects 1 to 6, further including that the at least one processor and the memory are configured to: receive information regarding a relationship between the at least one BPL of the first set of BPLs and beams of the second subset of receiver-side beams, where selecting the first subset of receiver-side beams is based on the received information.

Aspect 8 is the apparatus of any of aspects 1 to 7, further including that to determine the second set of BPLs, the at least one processor and the memory are configured to: select a first subset of a plurality of transmitter-side beams based on the at least one BPL of the first set of BPLs, where each transmitter-side beam of the first subset of transmitter-side beams is capable of full-duplex operation with the transmitter-side beam of at least one BPL of the first set of BPLs; evaluate the first subset of transmitter-side beams based on the set of reference signals; and select one or more BPLs based on the first subset of transmitter-side beams that satisfy a quality threshold based on the evaluating.

Aspect 9 is the apparatus of any of aspects 1 to 8, further including that the set of reference signals are associated with at least two transmitter-side beams.

Aspect 10 is the apparatus of any of aspects 1 to 9, further including that a second subset of the plurality of transmitter-side beams comprises the transmitter-side beam of the at least one BPL of the first set of BPLs.

Aspect 11 is the apparatus of any of aspects 1 to 10, further including that the first subset of transmitter-side beams is associated with a first antenna array or a first TRP of the second wireless device and the second subset of transmitter-side beams is associated with a second antenna array or a second TRP of the second wireless device, the first antenna array or the first TRP being different than the second antenna array or the second TRP.

Aspect 12 is the apparatus of any of aspects 1 to 11, further including that the at least one processor and the memory are configured to: receive information regarding a relationship between beams of the first subset of transmitter-side beams and beams of the second subset of transmitter-side beams, where selecting the first subset of transmitter-side beams is based on the received information.

Aspect 13 is the apparatus of any of aspects 1 to 12, further including that the at least one processor and the memory are configured to: receive information regarding a relationship between the at least one BPL of the first set of BPLs and beams of the second subset of transmitter-side beams, where selecting the first subset of transmitter-side beams is based on the received information.

Aspect 14 is the apparatus of any of aspects 1 to 13, further including that the at least one processor and the memory are configured to: report at least one of the first set of BPLs and the second set of BPLs to the second wireless device or to a control node.

Aspect 15 is the apparatus of any of aspects 1 to 14, further including that the first wireless device comprises a UE or a mobile termination node and the second wireless device comprises a first TRP and a second TRP.

Aspect 16 is the apparatus of any of aspects 1 to 15, further including that the first wireless device and the second wireless device are each capable of full-duplex operation.

Aspect 17 is the apparatus of any of aspects 1 to 14, further including that the first wireless device comprises a UE or a mobile termination node and the second wireless device comprises a base station or a distributed unit node.

Aspect 18 is the apparatus of any of aspects 1 to 17, further including that the first wireless device and the second wireless device are each capable of full-duplex operation.

Aspect 19 is the apparatus of any of aspects 1 to 18, further including that the first set of BPLs are associated with the second wireless device and the second set of BPLs are associated with a third wireless device different than the second wireless device.

Aspect 20 is the apparatus of any of aspects 1 to 19, further including that the first wireless device comprises a UE or a mobile termination node, the second wireless device comprises a first distributed unit node, and the third wireless device comprises a second distributed unit node.

Aspect 21 is the apparatus of any of aspects 1 to 20, further including that the first wireless device is capable of full-duplex operation.

Aspect 22 is the apparatus of any of aspects 1 to 19, further including that the first wireless device comprises a base station or a distributed unit node, the second wireless device comprises a first UE or a mobile termination node, and the third wireless device comprises a second UE or a mobile termination node.

Aspect 23 is the apparatus of any of aspects 1 to 22, further including that the first wireless device is capable of full-duplex operation.

Aspect 24 is the apparatus of any of aspects 1 to 23, further including that the at least one processor and the memory are configured to: receive relationship information between beams of a first subset of transmitter-side beams of the second wireless device and beams of a second subset of transmitter-side beams of the third wireless device, where the first set of BPLs are associated with a subset of the first subset of transmitter-side beams and the second set of BPLs are associated with a subset of the second subset of transmitter-side beams, and where determining the second set of BPLs is based on the received information.

Aspect 25 is the apparatus of any of aspects 1 to 24, further including that the beams of the first subset of transmitter-side beams and the beams of the second subset of transmitter-side beams are associated with cross-link interference that satisfies an interference threshold.

Aspect 26 is the apparatus of any of aspects 1 to 25, further including that the first wireless device reports a third set of BPLs to the third wireless device based on the first set of BPLs.

Aspect 27 is the apparatus of any of aspects 1 to 26, further including that the third set of BPLs comprises at least one of: BPLs that are incapable of full-duplex operation with the at least one BPL of the first set of BPLs, or BPLs that fail to satisfy a quality threshold.

Aspect 28 is the apparatus of any of aspects 1 to 27, further including that the third set of BPLs comprises BPLs that are capable of full-duplex operation with the at least one BPL of the first set of BPLs and that satisfy a quality threshold.

Aspect 29 is the apparatus of any of aspects 1 to 14, further including that the first wireless device comprises an IAB device comprising a mobile termination node associated with a first set of receiver-side beams and a distributed unit node associated with a second set of receiver-side beams.

Aspect 30 is the apparatus of any of aspects 1 to 29, further including that the mobile termination node is in communication with a parent node and the distributed unit node is in communication with at least one child node, and where the IAB device is capable of full-duplex operation with the parent node and the child node.

Aspect 31 is the apparatus of any of aspects 1 to 30, further including that the first set of BPLs are associated with the parent node and where the second set of BPLs are associated with the child node.

Aspect 32 is the apparatus of any of aspects 1 to 31, further including that the second set of BPLs are selected based on a subset of the second set of receiver-side beams, and where each of the receiver-side beams of the subset are capable of full-duplex operation with receiver-side beams of the first set of BPLs.

Aspect 33 is the apparatus of any of aspects 1 to 31, further including that the second set of BPLs are associated with a cross-link interference with the first set of BPLs that satisfies an interference threshold.

Aspect 34 is the apparatus of any of aspects 1 to 33, further including that the first wireless device reports a third set of BPLs to the second wireless device or to a control node based on the first set of BPLs.

Aspect 35 is the apparatus of any of aspects 1 to 34, further including that the third set of BPLs comprises BPLs that are incapable of full-duplex operation with the at least one BPL of the first set of BPLs.

Aspect 36 is the apparatus of any of aspects 1 to 35, further including that the third set of BPLs comprises BPLs that are capable of full-duplex operation with the at least one BPL of the first set of BPLs and that satisfy a quality threshold.

Aspect 37 is the apparatus of any of aspects 1 to 36, further including that the first set of BPLs are associated with the child node and where the second set of BPLs are associated with the parent node.

Aspect 38 is the apparatus of any of aspects 1 to 37, further including that the second set of BPLs are selected from a subset of the second set of receiver-side beams, and where each of the receiver-side beams of the subset are capable of full-duplex operation with receiver-side beams of the first set of BPLs.

Aspect 39 is the apparatus of any of aspects 1 to 38, further including that the second set of BPLs are associated with a cross-link interference with the first set of BPLs that satisfies an interference threshold.

Aspect 40 is the apparatus of any of aspects 1 to 39, further including that the first wireless device reports a third set of BPLs to the second wireless device or to a control node based on the first set of BPLs.

Aspect 41 is the apparatus of any of aspects 1 to 40, further including that the third set of BPLs comprises BPLs that are incapable of full-duplex operation with the at least one BPL of the first set of BPLs.

Aspect 42 is the apparatus of any of aspects 1 to 41, further including that the third set of BPLs comprises BPLs that are capable of full-duplex operation with the at least one BPL of the first set of BPLs and that satisfy a quality threshold.

Aspect 43 is the apparatus of any of aspects 1 to 42, further including a transceiver coupled to the at least one processor.

Aspect 44 is a method of wireless communication for implementing any of aspects 1 to 43.

Aspect 45 is an apparatus for wireless communication including means for implementing any of aspects 1 to 43.

Aspect 46 is a non-transitory computer-readable storage medium storing computer executable code, where the code, when executed, causes a processor to implement any of aspects 1 to 43.

What is claimed is:

1. An apparatus for wireless communication at a first wireless device, comprising:
    memory; and
    at least one processor coupled to the memory and configured to:
        receive a set of reference signals from a second wireless device;
        determine a first set of beam-pair links (BPLs) based on the set of reference signals, wherein each BPL in the first set of BPLs includes a first transmit beam and a first receive beam;
        determine to evaluate a second set of BPLs based on a capability of the second set of BPLs for full-duplex operation with at least one BPL of the first set of BPLs, wherein each BPL in the second set of BPLs includes a second transmit beam and a second receive beam, and wherein to determine the second set of BPLs, the at least one processor is configured to:
            select, from a plurality of receiver-side beams, a first subset of receiver-side beams based on the at least one BPL of the first set of BPLs, wherein the plurality of receiver-side beams excludes a receiver-side beam of the at least one BPL of the first set of BPLs, or
            select, from a plurality of transmitter-side beams, a first subset of transmitter-side beams based on the at least one BPL of the first set of BPLs, wherein the plurality of transmitter-side beams excludes a transmitter-side beam of the at least one BPL of the first set of BPLs;
        perform measurements for the second set of BPLs; and
        communicate using the full-duplex operation by transmitting or receiving via a first BPL of the first set of BPLs while also performing a different one of transmitting or receiving via a second BPL of the second set of BPLs.

2. The apparatus of claim 1, wherein to determine the first set of BPLs, the at least one processor is configured to:
    evaluate a plurality of beams based on the set of reference signals; and
    select one or more BPLs based on one or more beams that satisfy a quality threshold based on an evaluation of the plurality of beams.

3. The apparatus of claim 1, wherein to determine the second set of BPLs, the at least one processor is further configured to:
    evaluate the first subset of receiver-side beams based on the set of reference signals; and
    select one or more BPLs based on the first subset of receiver-side beams that satisfy a quality threshold based on an evaluation of the first subset of receiver-side beams.

4. The apparatus of claim 3, wherein a second subset of receiver-side beams comprises the receiver-side beam of the at least one BPL of the first set of BPLs.

5. The apparatus of claim 4, wherein the first subset of receiver-side beams is associated with a first antenna array of the first wireless device and the second subset of receiver-side beams is associated with a second antenna array of the first wireless device, wherein the first antenna array is different than the second antenna array.

6. The apparatus of claim 4, wherein the at least one processor is configured to:
    receive information regarding a relationship between the at least one BPL of the first set of BPLs and beams of the second subset of receiver-side beams,
    wherein selecting the first subset of receiver-side beams is based on the information.

7. The apparatus of claim 1, wherein to determine the second set of BPLs, the at least one processor is further configured to:
    evaluate the first subset of transmitter-side beams based on the set of reference signals; and
    select one or more BPLs based on the first subset of transmitter-side beams that satisfy a quality threshold based on an evaluation of the first subset of transmitter-side beams.

8. The apparatus of claim 7, wherein the set of reference signals are associated with at least two transmitter-side beams.

9. The apparatus of claim 7, wherein a second subset of transmitter-side beams comprises the transmitter-side beam of the at least one BPL of the first set of BPLs.

10. The apparatus of claim 9, wherein the first subset of transmitter-side beams is associated with a first antenna array or a first TRP of the second wireless device and the second subset of transmitter-side beams is associated with a second antenna array or a second TRP of the second wireless device, the first antenna array or the first TRP being different than the second antenna array or the second TRP.

11. The apparatus of claim 9, wherein the at least one processor is configured to:

receive information regarding a relationship between first beams of the first subset of transmitter-side beams and second beams of the second subset of transmitter-side beams,
wherein selecting the first subset of transmitter-side beams is based on the information.

12. The apparatus of claim 9, wherein the at least one processor is configured to:
receive information regarding a relationship between the at least one BPL of the first set of BPLs and beams of the second subset of transmitter-side beams,
wherein selecting the first subset of transmitter-side beams is based on the information.

13. The apparatus of claim 1, wherein the at least one processor is configured to:
report at least one of the first set of BPLs and the second set of BPLs to the second wireless device or to a control node.

14. The apparatus of claim 1, wherein the first wireless device comprises a user equipment (UE) or a mobile termination node and the second wireless device comprises a first transmission—reception point (TRP) and a second TRP.

15. The apparatus of claim 1, wherein the first wireless device comprises a user equipment (UE) or a mobile termination node and the second wireless device comprises a base station or a distributed unit node.

16. The apparatus of claim 1, wherein the first set of BPLs are associated with the second wireless device and the second set of BPLs are associated with a third wireless device different than the second wireless device.

17. The apparatus of claim 16, wherein the first wireless device comprises a user equipment (UE) or a mobile termination node, the second wireless device comprises a first distributed unit node, and the third wireless device comprises a second distributed unit node.

18. The apparatus of claim 16, wherein the first wireless device comprises a base station or a distributed unit node, the second wireless device comprises a first user equipment (UE) or a first mobile termination node, and the third wireless device comprises a second UE or a second mobile termination node.

19. The apparatus of claim 16, wherein the at least one processor is configured to:
receive relationship information between first beams of the first subset of transmitter-side beams of the second wireless device and second beams of a second subset of transmitter-side beams of the third wireless device,
wherein the first set of BPLs are associated with a first subset of the first subset of transmitter-side beams and the second set of BPLs are associated with a second subset of the second subset of transmitter-side beams, and
wherein determining the second set of BPLs is based on the relationship information.

20. The apparatus of claim 16, wherein the first wireless device reports a third set of BPLs to the third wireless device based on the first set of BPLs.

21. The apparatus of claim 1, wherein the first wireless device comprises an integrated access and backhaul (IAB) device comprising a mobile termination node associated with a first set of receiver-side beams and a distributed unit node associated with a second set of receiver-side beams.

22. The apparatus of claim 21, wherein the mobile termination node is in communication with a parent node and the distributed unit node is in communication with at least one child node, and wherein the IAB device is capable of the full-duplex operation with the parent node and the at least one child node.

23. The apparatus of claim 22, wherein the first wireless device reports a third set of BPLs to the second wireless device or to a control node based on the first set of BPLs.

24. The apparatus of claim 23, wherein the second set of BPLs are selected from a subset of the second set of receiver-side beams, and wherein each receiver-side beam of the subset is capable of the full-duplex operation with receiver-side beams of the first set of BPLs.

25. The apparatus of claim 23, wherein the first set of BPLs are associated with the at least one child node and wherein the second set of BPLs are associated with the parent node.

26. The apparatus of claim 25, wherein the second set of BPLs are associated with a cross-link interference with the first set of BPLs that satisfies an interference threshold.

27. The apparatus of claim 26, wherein the first wireless device reports the third set of BPLs to the second wireless device or to the control node based on the first set of BPLs.

28. The apparatus of claim 1, further comprising a transceiver coupled to the at least one processor, the transceiver being configured to receive the set of reference signals from the second wireless device, and communicate using the full-duplex operation by transmitting or receiving via the first BPL of the first set of BPLs while also performing the different one of transmitting or receiving via the second BPL of the second set of BPLs.

29. The apparatus of claim 1, wherein the at least one processor is further configured to:
receive first relationship information regarding a full-duplex capability associated with each reference signal of the set of reference signals, wherein a first selection of the first subset of receiver-side beams is further based on the first relationship information, or a second selection of the first subset of transmitter-side beams is further based on the first relationship information.

30. A method of wireless communication at a first wireless device, comprising:
receiving a set of reference signals from a second wireless device;
determining a first set of beam-pair links (BPLs) based on the set of reference signals, wherein each BPL in the first set of BPLs includes a first transmit beam and a first receive beam;
determining to evaluate a second set of BPLs based on a capability of the second set of BPLs for full-duplex operation with at least one BPL of the first set of BPLs, wherein each BPL in the second set of BPLs includes a second transmit beam and a second receive beam, and wherein determining the second set of BPLs comprises:
selecting, from a plurality of receiver-side beams, a first subset of receiver-side beams based on the at least one BPL of the first set of BPLs, wherein the plurality of receiver-side beams excludes a receiver-side beam of the at least one BPL of the first set of BPLs, or
selecting, from a plurality of transmitter-side beams, a first subset of transmitter-side beams based on the at least one BPL of the first set of BPLs, wherein the plurality of transmitter-side beams excludes a transmitter-side beam of the at least one BPL of the first set of BPLs;
performing measurements for the second set of BPLs; and
communicating using the full-duplex operation by transmitting or receiving via a first BPL of the first set of BPLs while also performing a different one of transmitting or receiving via a second BPL of the second set of BPLs.

31. The method of claim 30, wherein determining the first set of BPLs comprises:
   evaluating a plurality of beams based on the set of reference signals; and
   selecting one or more BPLs based on one or more beams that satisfy a quality threshold based on evaluating the plurality of beams.

* * * * *